US008061640B2

(12) United States Patent
Cotter et al.

(10) Patent No.: US 8,061,640 B2
(45) Date of Patent: Nov. 22, 2011

(54) INTERCHANGABLE CHIPPER INSERTS FOR WOOD GRINDER

(75) Inventors: Chad J. Cotter, Weidman, MI (US); Nelson C. Langworthy, Vestaburg, MI (US)

(73) Assignee: Morbark, Inc., Winn, MI (US)

( * ) Notice: Subject to any disclaimer, the term of this patent is extended or adjusted under 35 U.S.C. 154(b) by 338 days.

(21) Appl. No.: 12/372,078

(22) Filed: Feb. 17, 2009

(65) Prior Publication Data

US 2010/0206973 A1 Aug. 19, 2010

(51) Int. Cl.
*A47J 43/25* (2006.01)

(52) U.S. Cl. ................. 241/101.01; 241/189.1; 241/277

(58) Field of Classification Search ............. 241/101.01, 241/189.1, 191, 277
See application file for complete search history.

(56) References Cited

U.S. PATENT DOCUMENTS

| | | | | |
|---|---|---|---|---|
| 3,680,797 | A * | 8/1972 | Covey | 241/73 |
| 4,729,516 | A * | 3/1988 | Williams, Jr. | 241/186.4 |
| 4,826,090 | A * | 5/1989 | Orphall | 241/191 |
| 5,713,525 | A | 2/1998 | Morey | |
| 5,863,003 | A | 1/1999 | Smith | |
| 6,042,035 | A * | 3/2000 | Grobler et al. | 241/191 |
| 6,045,072 | A * | 4/2000 | Zehr | 241/189.1 |
| 6,047,912 | A | 4/2000 | Smith | |
| 6,059,210 | A | 5/2000 | Smith | |
| 6,293,481 | B1 | 9/2001 | Ragnarsson | |
| 6,299,082 | B1 | 10/2001 | Smith | |
| 6,394,378 | B1 | 5/2002 | Ragnarsson | |
| 6,520,440 | B2 | 2/2003 | Ragnarsson | |
| 6,581,859 | B2 * | 6/2003 | Adams et al. | 241/72 |
| 6,641,065 | B2 | 11/2003 | Bardos et al. | |
| 6,845,931 | B1 | 1/2005 | Smith | |
| 6,880,774 | B2 * | 4/2005 | Bardos et al. | 241/189.1 |
| 6,953,167 | B2 | 10/2005 | Strong | |
| 7,055,770 | B2 | 6/2006 | Bardos | |
| 7,293,729 | B2 * | 11/2007 | Ragnarsson | 241/197 |
| 7,448,567 | B2 | 11/2008 | Roozeboom et al. | |
| 7,624,490 | B2 * | 12/2009 | Bardos | 29/428 |
| 2002/0190148 | A1 * | 12/2002 | Roozeboom et al. | 241/189.1 |
| 2004/0113001 | A1 * | 6/2004 | Jorgensen | 241/191 |
| 2005/0121550 | A1 * | 6/2005 | Smith | 241/189.1 |
| 2008/0061176 | A1 * | 3/2008 | Smith | 241/189.1 |

* cited by examiner

*Primary Examiner* — Bena Miller
(74) *Attorney, Agent, or Firm* — Warner Norcross & Judd LLP

(57) ABSTRACT

A plurality of chipper inserts that may be installed on a hammermill rotor in place of the hammer inserts to selectively convert the rotor to a chipper. The chipper inserts include drum surfaces that cooperatively define a chipper drum. The chipper inserts may include cutter inserts that have a cutter disposed in a cutter pocket. The chipper drum may be a generally continuous cylindrical interrupted essentially only by the cutter pockets. The cutters and cutter pockets may be positioned in essentially any desired pattern around the drum. The chipper inserts may include a left cutter insert, a center cutter insert, a right cutter insert and three different size spacer inserts. The different types of cutter inserts and spacer inserts may be installed about the rotor with at least one left cutter insert mounted on the left end of the chipper drum and at least one right cutter insert mounted on the right end of the chipper drum. The chipper inserts may be configured in quadrant sections, such that it takes four inserts to extend around the rotor.

20 Claims, 19 Drawing Sheets

Bare Rotor

END PIECE SHOWN
206
210
222
224
226
228
230
232
234
236
238
240
242
244
246
250
252
254
256
258

INTERCHANGABLE CHIPPER INSERTS FOR WOOD GRINDER

BACKGROUND OF THE INVENTION

The present invention relates to equipment for reducing wood and more particularly to wood reduction machines for chipping or grinding scrap timber, limbs, brush and other wood waste.

There is a wide variety of machines available on the market for reducing waste wood, such as scrap timber, tree limbs and brush. The two most common types of wood reduction machines are chippers and grinders. As the names imply, chippers reduce wood by cutting it into wood chips using a set of chipper knives and grinders operate by essentially hammering wood into wood fragments using a hammermill.

The type of wood reduction equipment used in a given situation is often dictated by the character of the wood waste. On the market, wood chips typically bring a premium over ground wood. However, not all wood waste is suitable for the production of wood chips. With lower quality wood waste that may include a substantial amount of sand, gravel and other contaminants, it may be desirable to use a wood grinder. The hammers used in wood grinders typically have a greater ability to withstand the contaminants than the knives contained in wood chippers. As a result, it may be desirable to grind lower quality wood waste to avoid the excess wear that might occur during chipping. Given the premium enjoyed by wood chips, higher quality wood waste is often reduced using a wood chipper. Wood reduction equipment can be rather expensive, and many wood waste processors may not be able to afford both wood grinders and wood chippers.

With the continued push toward renewable resources and recycling, there has been a growth in the demand for wood fuel sources. Reduced wood waste is an ideal wood fuel source for many wood fuel applications. Although lower quality wood waste may be used as a fuel source, ground wood waste can present problems for wood fuel handling systems. For example, large consumers of wood-based fuels will often include pneumatic feed systems for conveying wood fuel from a supply center to the wood burner. Many conventional pneumatic feed systems do not work as well with ground wood waste, presumably because it has a greater tendency than wood chips to cling or clump together. Many wood processors that process lower quality wood waste have purchased wood grinders to avoid the excess wear that might accompany wood chippers. Because of the increasing demand for wood chips produced from lower quality wood waste, these processors might wish to be able to at least occasionally produce wood chips. However, the cost of adding a wood chipper to permit occasion use may be cost prohibitive. Accordingly, there is an increased need to allow existing wood grinders to be at least temporarily converted into chippers for reducing wood waste into wood chips.

At least one wood grinder (or wood hog) available on the market is available with interchangeable chipper attachments that allow its hammermill to be converted into a chipping mill. This wood grinder includes a generally conventional stacked-plate rotor in which hammer inserts are secured in annular channels in the rotor by a plurality of rotor pins. To convert to a wood chipper, the hammer inserts are removed and replaced with knife inserts. The knife inserts are spaced apart from one another around the rotor, and are mounted in the annular recesses on the rotor pins in essentially the same manner as the hammer inserts. The knife inserts are similar in width to the hammers inserts. The design and configuration of the knives is such that there the converted chipper mill has relatively large spaces between the knives and the knife holders. In fact, significant portions of the rotor plates are exposed to the wood waste during wood reduction. Although the knife inserts allow the wood grinder to be converted into a chipper, the system has inherent limitations that may affect chip quality and may lead to inconsistent chip size. For example, because of the open spaces between and around the knives, the chipper mill has relatively large dead spaces and provides relatively little control over chip size and chip quality.

SUMMARY OF THE INVENTION

The present invention provides chipper inserts that permit a hammermill rotor to selectively function as a chipper. In one embodiment, the chipper inserts may be assembled on the rotor in place of hammer inserts to cooperatively define a chipper drum. The chipper drum may be a generally continuous cylindrical interrupted essentially only by a plurality of cutter pockets. In one embodiment, a cutter is disposed in each cutter pocket. The cutters and cutter pockets may be positioned in essentially any desired pattern around the drum.

In one embodiment, the rotor includes a plurality of plates and spacers mounted on a shaft. In this embodiment, the plates may define a plurality of radially spaced openings to receive removable rotor pins extending parallel to the axis of rotation of the rotor. The rotor may include eight rotor pins spaced substantially evenly around the circumference of the plates. The hammer inserts and chipper inserts are alternatively mounted to the rotor by the rotor pins. In this embodiment, each insert may include one or more mounting legs that define openings to receive the rotor pins during assembly.

In one embodiment, the chipper inserts include a left cutter insert, a center cutter insert, a right cutter insert and three different size spacer inserts. In this embodiment, a plurality of left, center and right cutter inserts are assembled with a plurality of spacer inserts about the rotor to define a chipper drum having the desired cutter pattern. The left cutter inserts may include a cutter that is offset to the left. This permits the left cutter insert to be installed at the left end of the drum to reduce the dead space at that end. Similarly, the right cutter inserts may include a cutter that is offset to the right. A right cutter insert may be installed at the right end of the drum to reduce the dead space at that end. The spacer inserts may be provided in different sizes, which each sized to provide a generally continuous surface to fill in spaces between the chipper inserts.

In one embodiment, the chipper inserts and spacer inserts are configured in quadrant sections, such that it takes four inserts to extend around the circumference of the rotor. In this embodiment, each insert may define a pair of mounting holes configured to be interfitted with an adjacent pair of rotor pins.

In one embodiment, the chipper inserts have an axial length substantially shorter than that of the chipper drum. For example, each chipper insert may be shorter than approximately one fourth of the axial length of the chipper drum.

In one embodiment, the cutters are double-edged blades that are removable secured in the cutter pockets. The cutters may be reversed when one edge becomes dull. The chipper inserts may include a cutter block supported within the cutter pocket. The cutters may be secured to the cutter blocks by bolts or other fasteners that facilitate quick and easy reversing or replacement of the cutters. The cutters protrude from the pockets a desired distance. This distance may vary from application to application depending in part on the desired chip size and the spacing between the chipper drum and the anvil or grinding grates.

In one embodiment, the rotor is mounted in a wood reduction apparatus having a variable speed infeed assembly. In such embodiments, the speed of the infeed assembly may be varied to assist in controlling chip size. A variety of other characteristics may additionally (or alternatively) be varied to assist in controlling chip size. For example, variations in rotor rotation speed, grate opening size, spacing between the cutters and the anvil/grates and, as noted above, the distance the cutters extend beyond the chipper drum may affect chip size and/or the consistency of the chipper output.

The present invention provides a simple and effective structure to permit a single wood reduction apparatus to selectively function as either a chipper or a grinder. The chipper inserts can be easily fitted onto an existing hammermill without the need to customize the rotor. For example, the chipper inserts may be designed for installation using the rotor pins of a conventional stacked-plate rotor. Accordingly, many types of pre-existing wood grinders can be converted into a wood grinder without any type of modification to the underlying rotor structure. This allows conversion with relatively limited labor and cost. Because the chipper inserts define a generally continuous drum, they facilitate consistent chip size and generally eliminate dead spaces. This translates to improved operation and improved output quality. The use of left and right cutter inserts allows the cutters to be positioned closer to the left and right ends of the chipper drum to reduce dead end spaces. Because the chipper inserts may be designed in quadrant sections and may be shorter in axial length than the rotor, the individual chipper inserts may be relatively easy to handle manually, which facilitates removal installation.

These and other objects, advantages, and features of the invention will be readily understood and appreciated by reference to the detailed description of the current embodiment and the drawings.

DESCRIPTION OF THE CURRENT EMBODIMENT

I. Overview

The present invention is directed to chipper inserts that permit a hammermill rotor (See FIGS. 1A and 1B) to selectively function as a chipper. The chipper inserts may be fitted onto a rotor in place of the hammer inserts to provide a chipper drum (See FIGS. 2A and 2B). For purposes of disclosure, the present invention is described in connection with illustrations of a specific wood reduction apparatus having a "stacked-plate" rotor (See FIG. 3). The present invention is not limited, however, to use with stacked-plate rotor, but instead is suitable for use with essentially any rotor capable of receiving interchangeable chipper inserts.

Figure 1A:
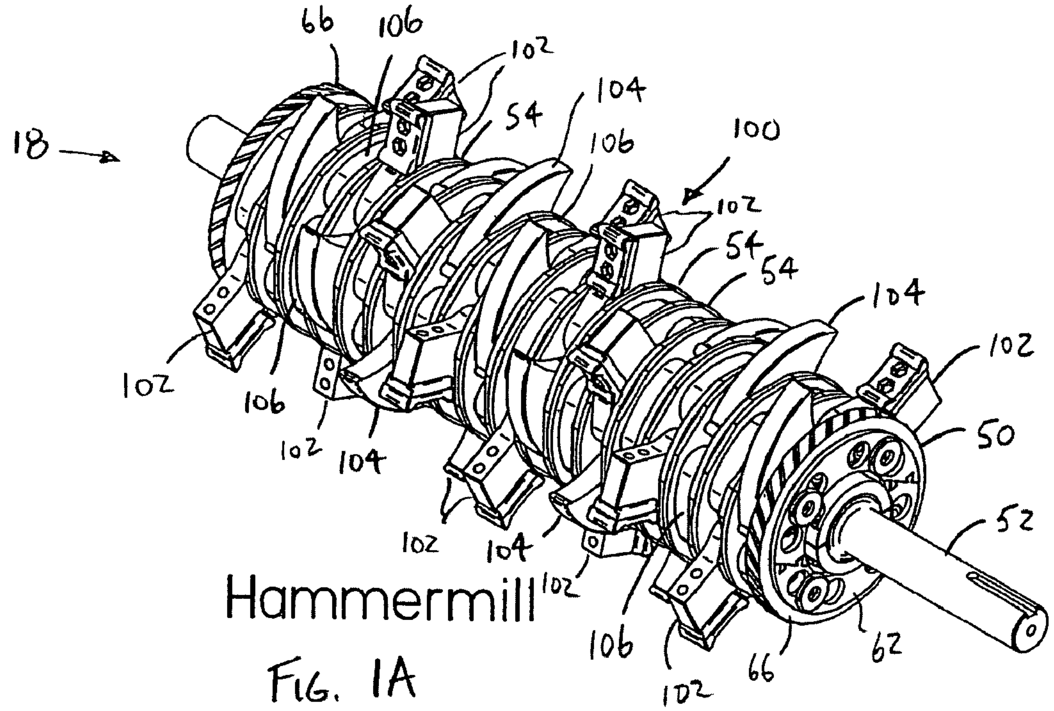
FIG. 1A is a perspective view of a hammermill in accordance with an embodiment of the present invention.
Figure 2A:
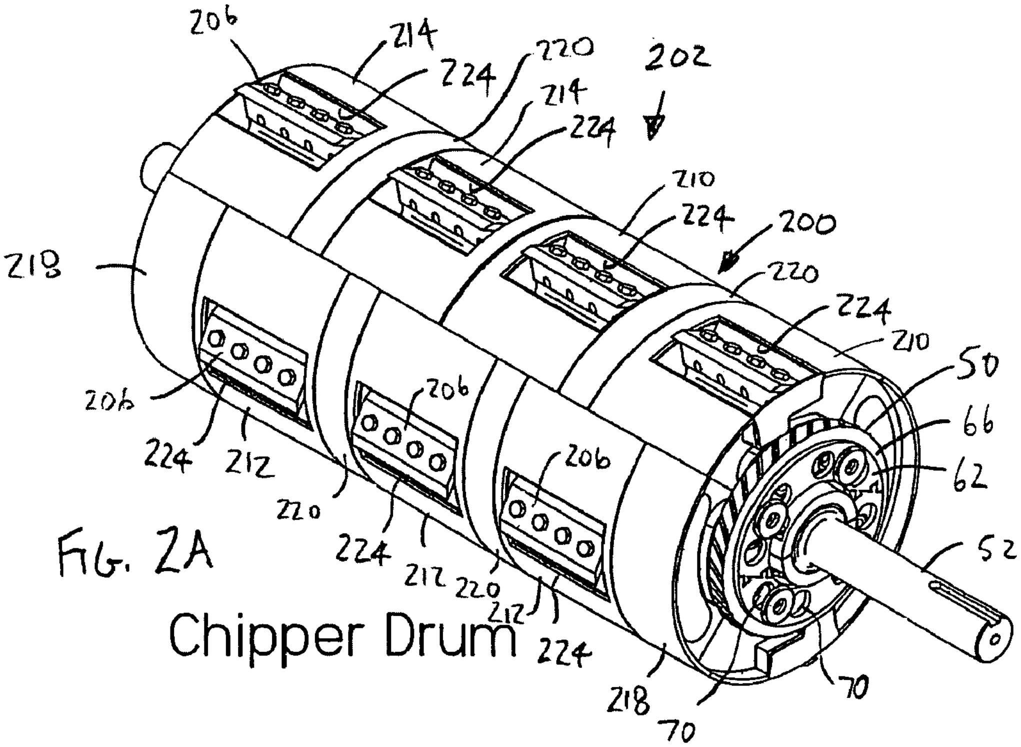
FIG. 2A is a perspective view of a chipper drum in accordance with an embodiment of the present invention.
Figure 3A:
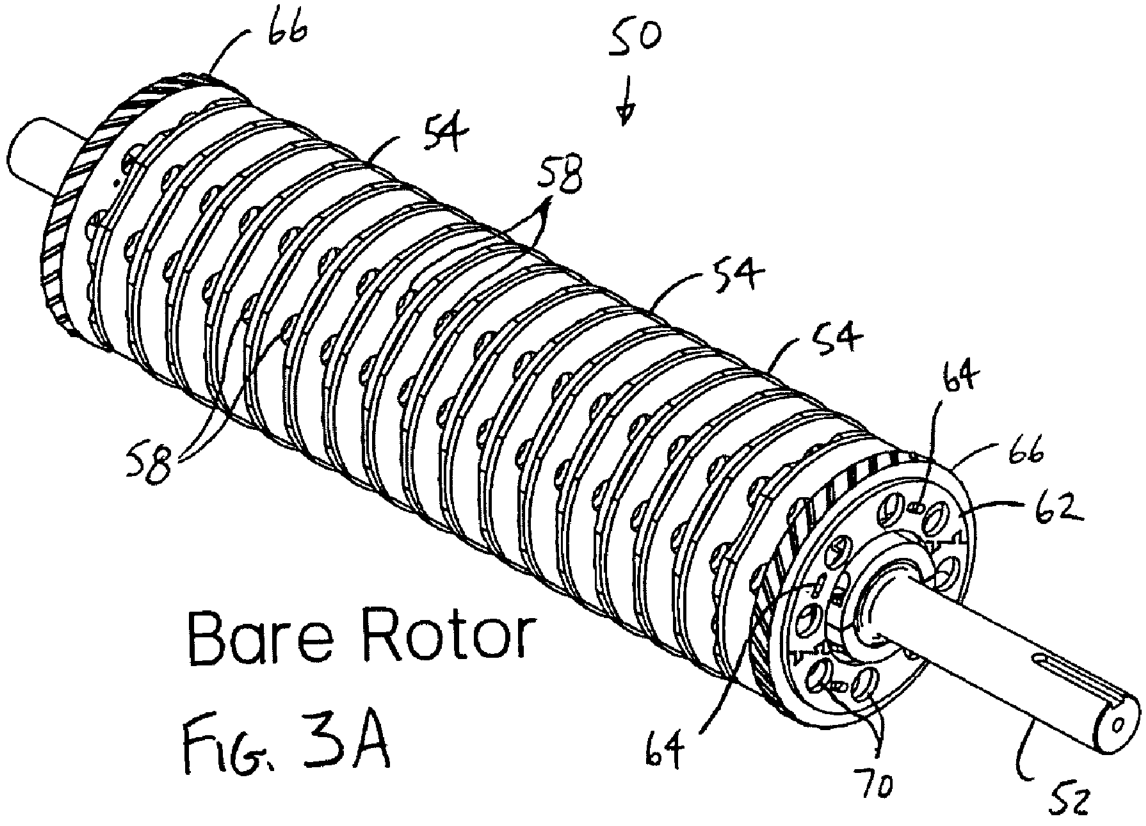
FIG. 3A is a perspective view of the rotor.
Figure 3B:
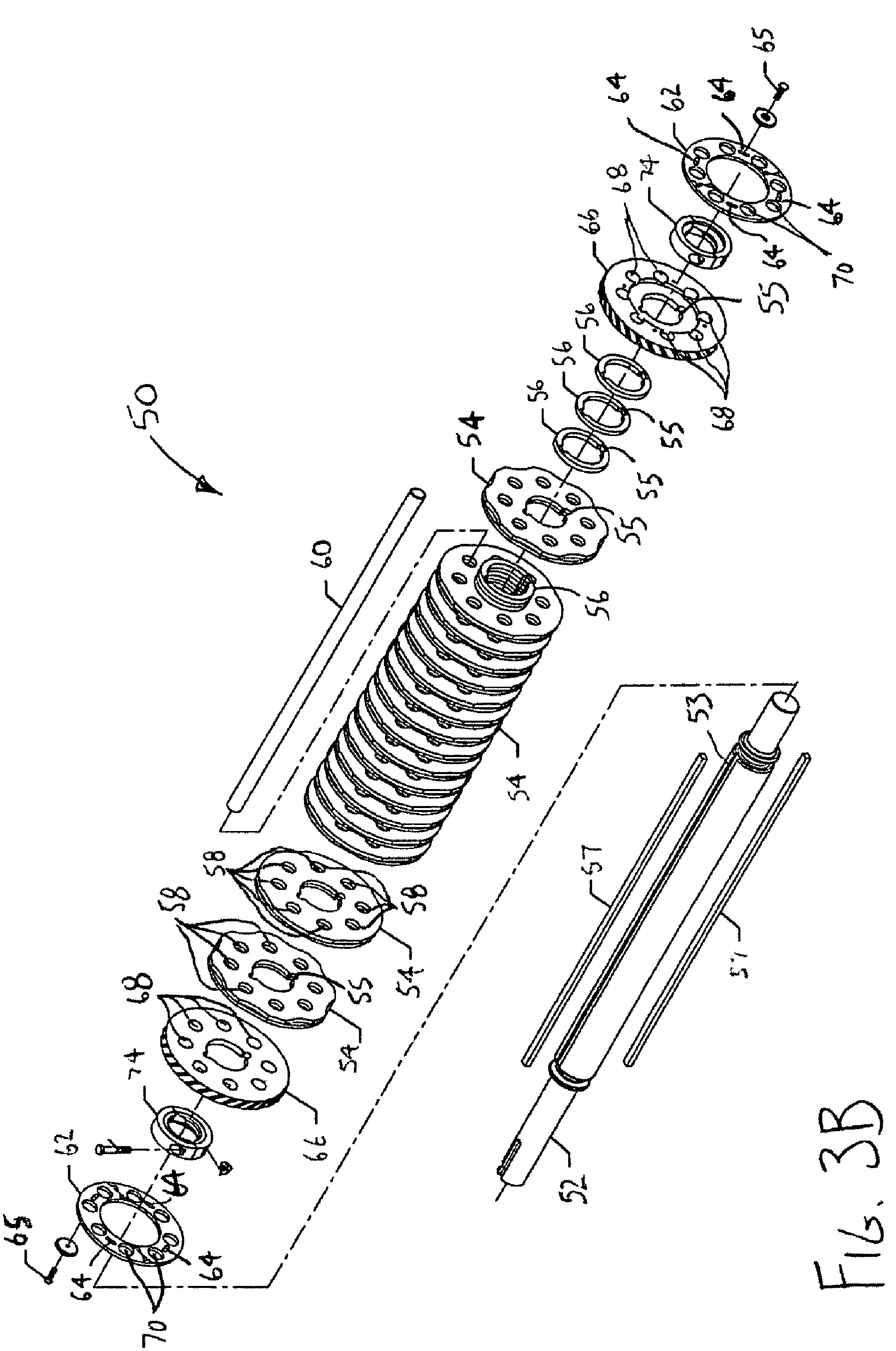
FIG. 3B is a partially exploded perspective view of the rotor.

In the illustrated embodiment, the rotor 50 generally includes a shaft 52 carrying a plurality of stacked rotor plates 54 and spacers 56 (See FIGS. 3A and 3B). The rotor plates 54 have a substantially greater diameter that the spacers 56. The rotor plates 54 and spacers 56 alternate along the shaft 52 to provide a plurality of annular slots to receive either hammer inserts 100 or chipper inserts 200. The rotor plates 54 define a plurality of rotor pin openings 58 to receive rotor pins 60. The rotor pins 60 extend axially along the rotor 50 and provide a mounting structure for the hammer inserts 100 and the chipper inserts 200. The hammer inserts 100 are generally conventional hammermill hammer inserts. When hammer inserts 100 are installed as shown in FIG. 1A, the assembly functions as a conventional wood grinder. The chipper inserts 200 are configured for installation on the rotor 50 in place of the hammer inserts 100. The illustrated embodiment includes a plurality of different types of chipper inserts 200 that are mounted by the rotor pins 60 and collectively form a chipper drum 202 about the rotor 50. The chipper drum 202 includes a generally continuous drum surface 202 and a plurality of cutter pockets 224. A cutter 206 is mounted in each pocket 224 to provide a knife for reducing wood waste primarily by cutting it into chips. The cutter pockets 224 and cutters 206 may be arranged around the rotor 50 in different patterns to provide the desired performance. When chipper inserts 200 are installed as shown in FIG. 2A, the assembly is effectively converted into a drum chipper capable of producing high quality, consistent output.

II. Wood Reduction Apparatus

For purposes of disclosure and not by way of limitation, the present invention is described in connection with a wood reduction apparatus that is generally identical to the Morbark Model 3800 Wood Hog, which is available from Morbark, Inc. of Winn, Mich. The Morbark Model 3800 Wood Hog Parts Manual is incorporated herein by reference in its entirety. The illustrated wood hog includes a stacked-plate rotor with removable hammer inserts. The illustrated wood hog includes a variety of optional features and components that are not necessary for implementation of the present invention. The present invention is not limited to use on or in connection with this specific wood hog or the specific rotor shown in the illustrations. To the contrary, the various features and aspects of the present invention are well suited for incorporation into a wide variety of wood reduction machines and a wide variety of rotors. For example, the present invention may be incorporated into essentially any wood reduction apparatus having a rotor that is capable of receiving interchangeable chipper inserts in accordance with the present invention.

Figure 4:
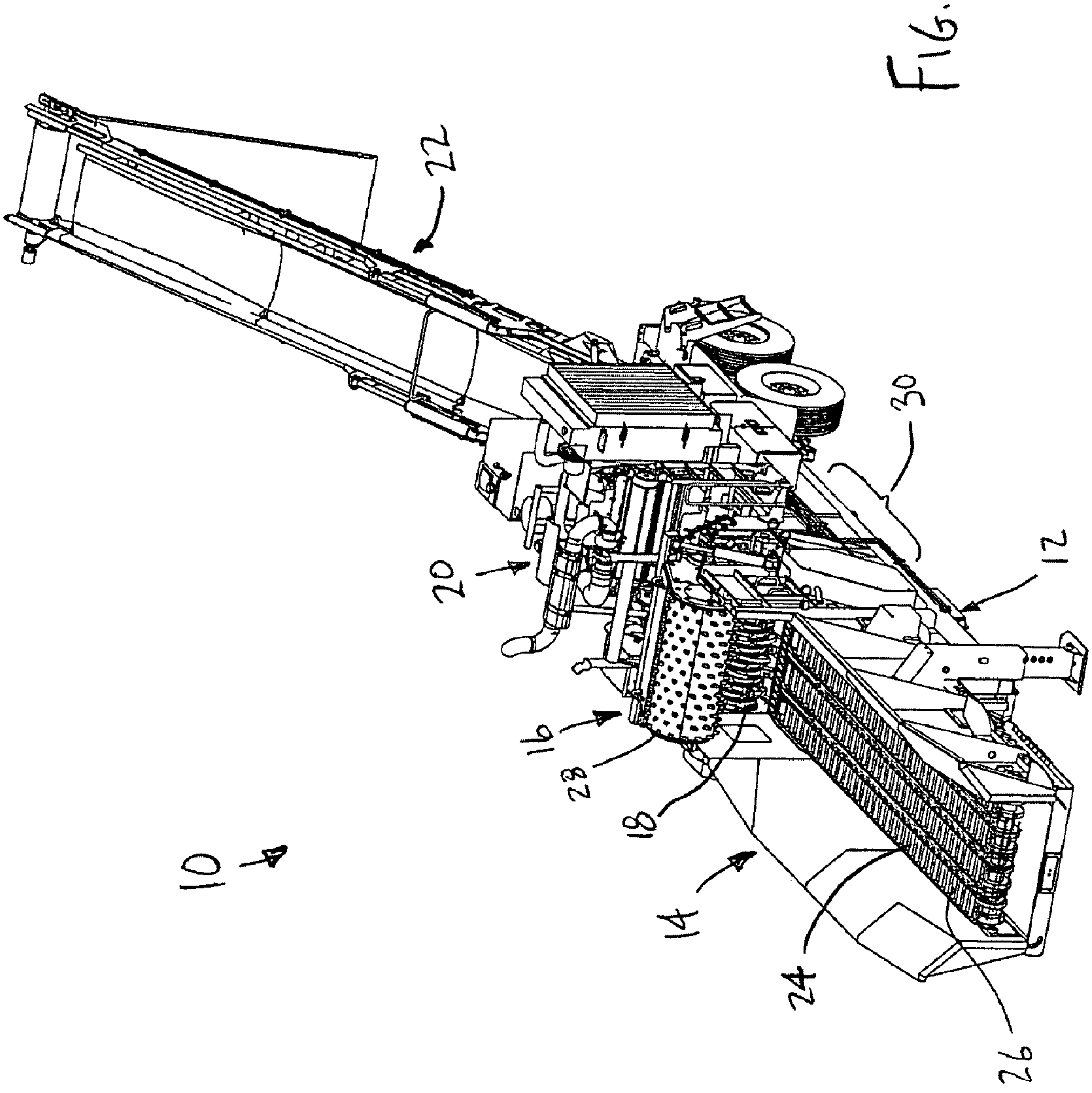
FIG. 4 is a perspective view of a wood grinder in accordance with an embodiment of the present invention.
Figure 6:
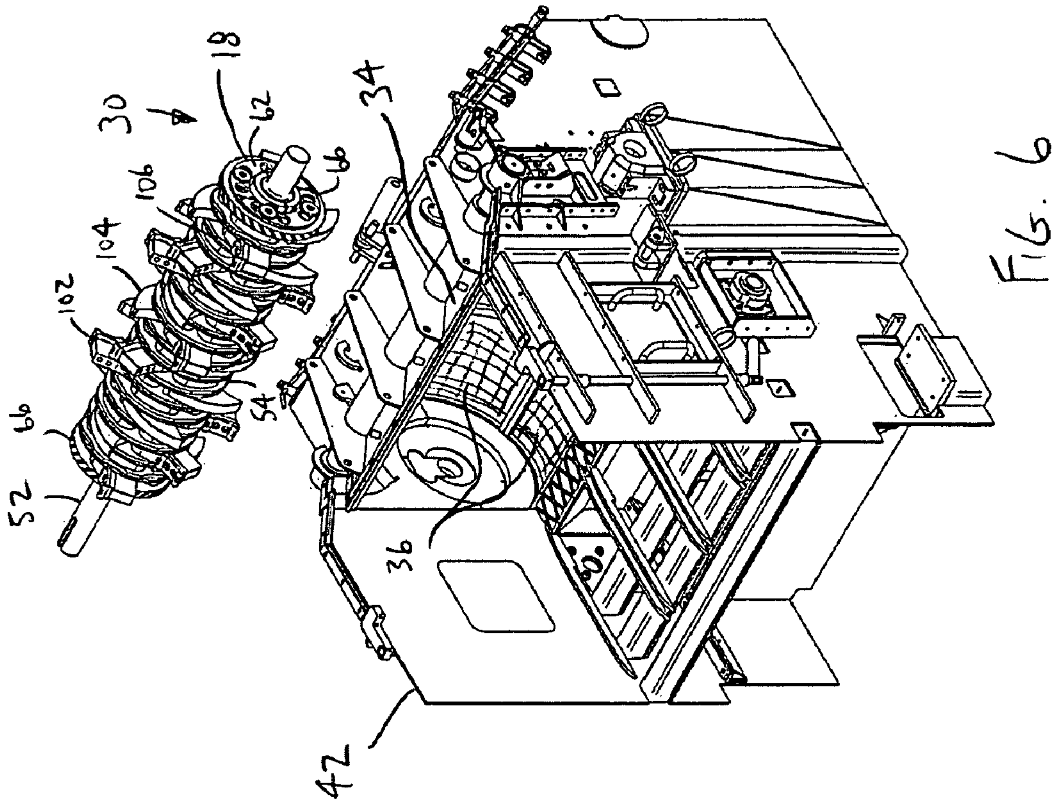
FIG. 6 is a partially exploded perspective view of the hammermill base assembly.
Figure 5:
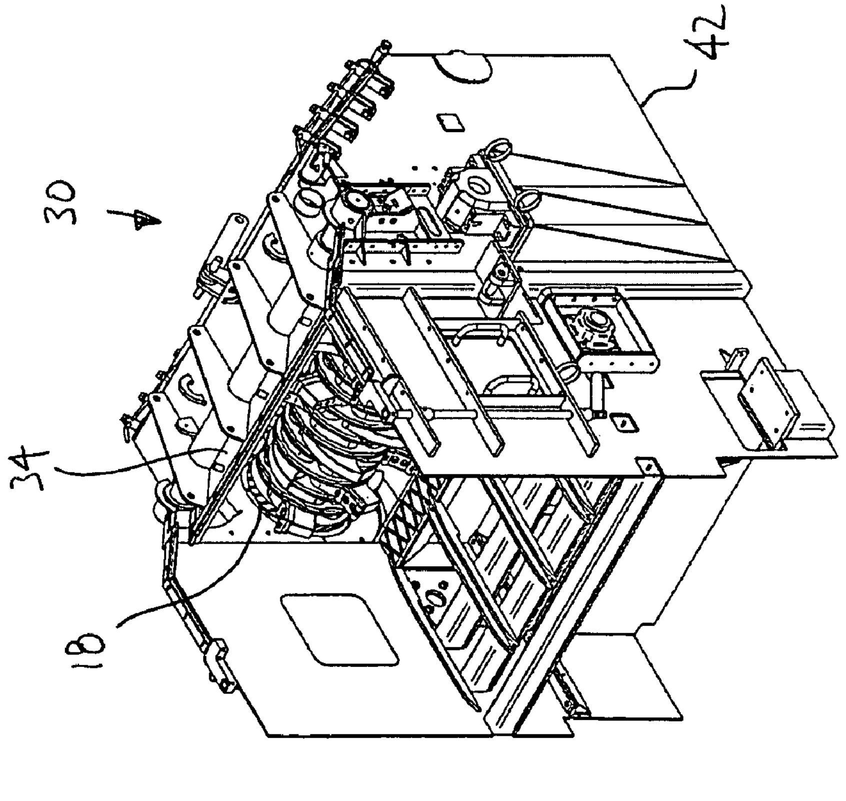
FIG. 5 is a perspective view of the hammermill base assembly.
Figure 12:
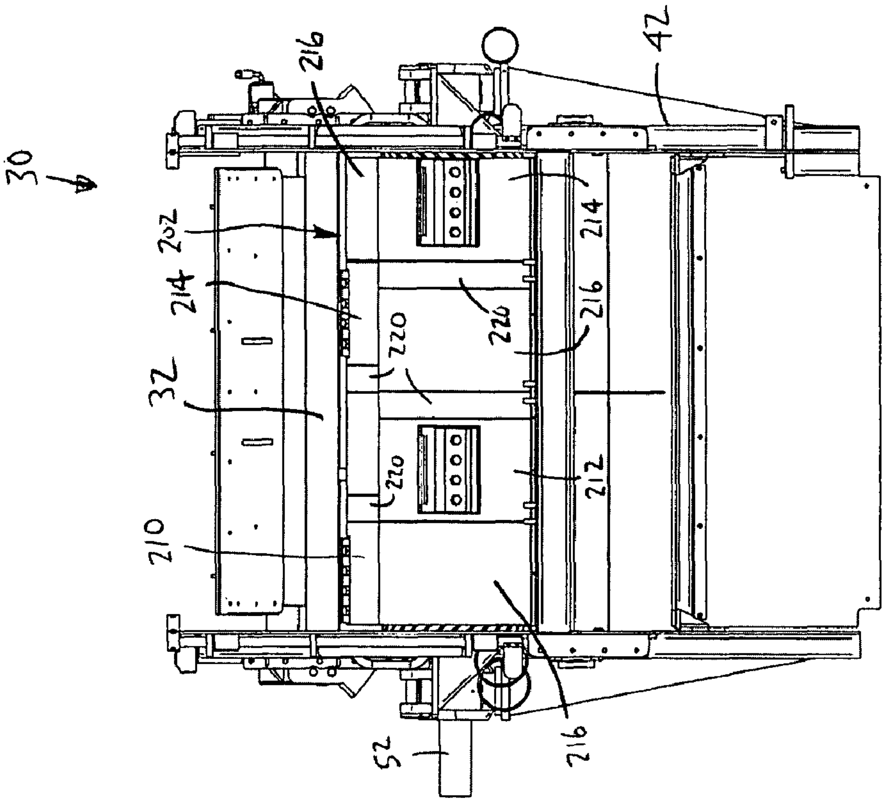
FIG. 12 is a front elevational view of the chipper drum base assembly.
Figure 7:
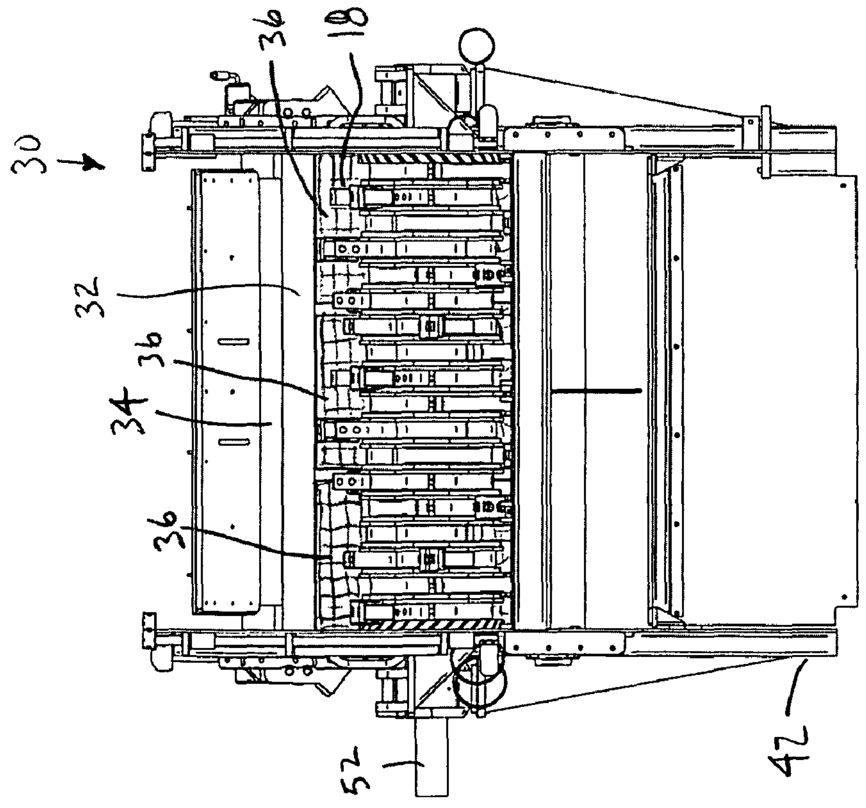
FIG. 7 is a front elevational view of the hammermill base assembly.
Figure 13:
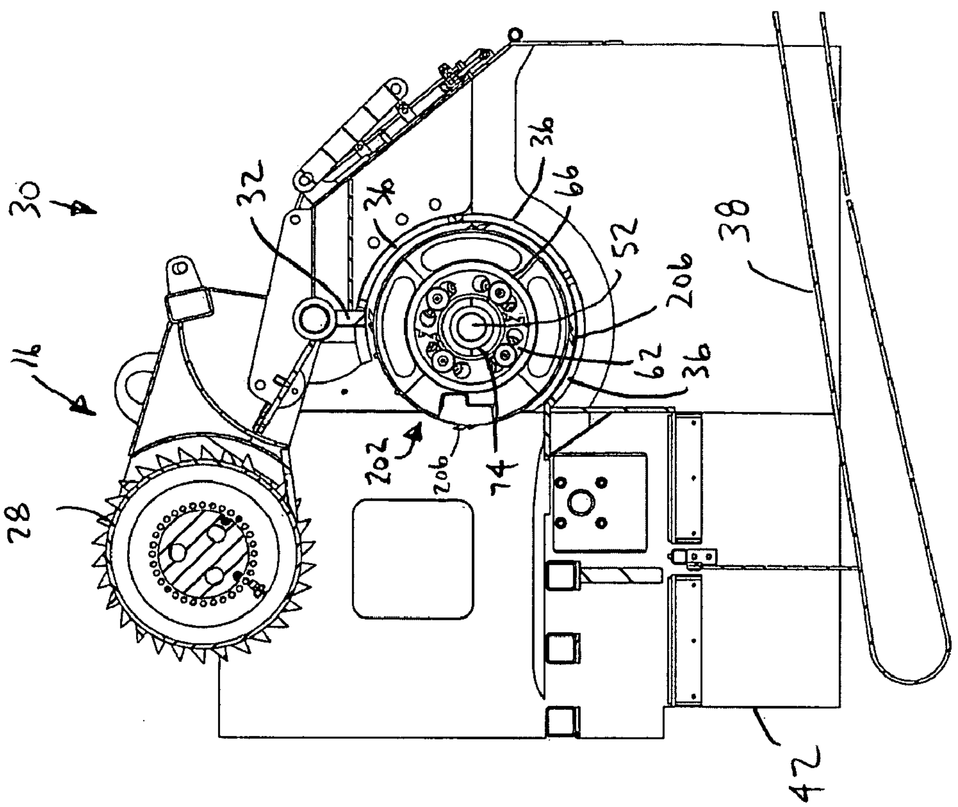
FIG. 13 is a sectional view of the chipper drum base assembly.
Figure 8:
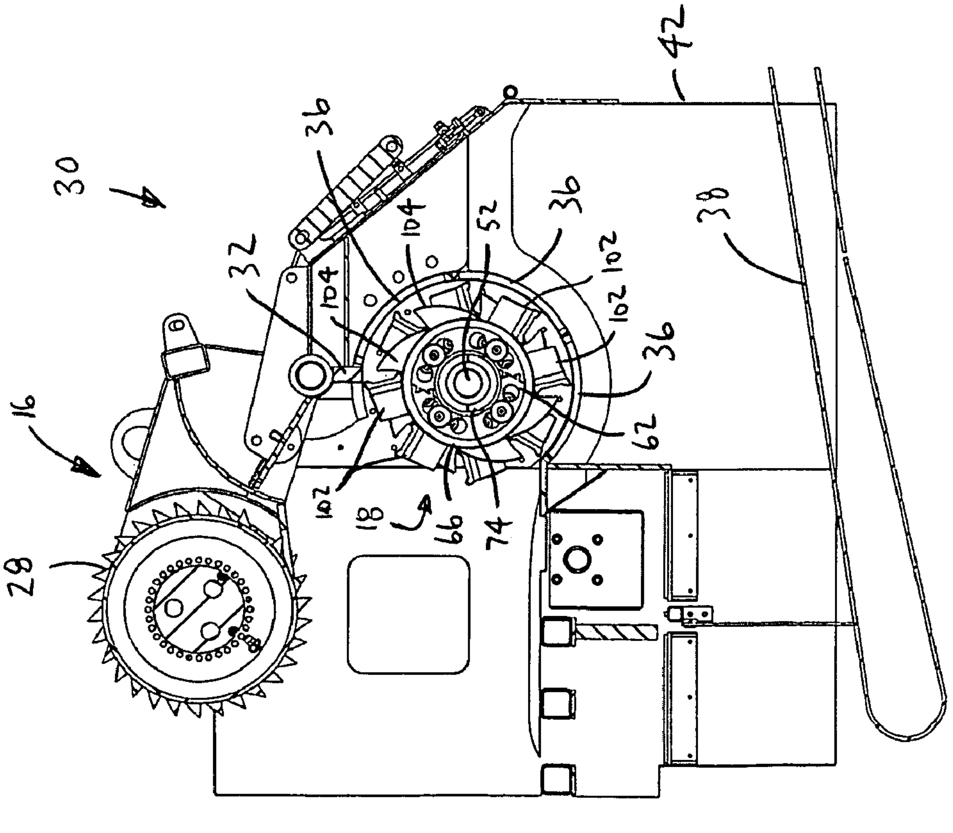
FIG. 8 is a sectional view of the hammermill base assembly.

A wood reduction apparatus 10 in accordance with an embodiment of the present invention is shown in FIG. 4. The wood reduction apparatus 10 is generally conventional (except as described herein) and therefore not described in detail. However, to facilitate an understanding of the present invention in the context of the illustrated embodiment, a brief overview is provided of the wood reduction apparatus and its operation. The illustrated wood reduction apparatus 10 generally includes a superstructure 12, an infeed assembly 14, a yoke assembly 16, a hammermill 18, an engine assembly 20 and an output conveyor 22. The infeed assembly 14 is mounted on the superstructure 12 and provides a mechanism for feeding wood waste into the hammermill 18. The infeed assembly 14 generally includes a bed 24 that is fitted with feed chains 26. The feed chains 26 are supported by the bed 24 and are power driven in a manner that draws the wood waste placed onto the bed 24 into the hammermill 18. The yoke assembly 16 includes a feed drum 28 that assists in shepherding wood waste into the hammermill 18. The yoke assembly 16 is pivotally mounted to superstructure 12 so that it can pivot up and down to accommodate wood waste of varying heights. The feed drum 28 may be rotated by a motor (not shown). The motor may be variable speed to allow control over the speed at which wood waste is fed into the hammermill 18. The yoke assembly 16 may include a hydraulic cylinder (or other suitable mechanism) for applying an appropriate downward force on the feed drum 28. The hammermill 18 is mounted within a base assembly 30. The base assembly 30 of this embodiment is shown in FIGS. 5-8. In the illustrated embodiment, the base assembly 30 generally includes a substructure 42 supporting an anvil 32, a hood 34 and a plurality of grates 36. The hammermill 18 is rotatably mounted to the substructure 42. The hammermill 18 is configured for upward rotation with respect the infeed side (i.e. the side on which wood waste is fed into the hammermill 18). Referring now to FIG. 7, the anvil 32 is mounted to the substructure 42 just above the hammermill 18. The spacing between the anvil 32 and hammermill 18 may vary, but is typically around $\frac{1}{4}^{th}$ of an inch. The grates 36 are mounted to the substructure 42 around the hammermill 18 (See FIG. 6, which shows the hammermill 18 removed from the base assembly 30). As perhaps best shown in FIG. 8, the grates 36 are curved to closely match the outer diameter of the hammermill 18. The spacing between the hammermill 18 and the grates 36 may correspond with the anvil spacing, but that is not strictly necessary. In operation, the hammermill 18 drives the wood waste upwardly hammering it into the anvil 32 and the grates 36. The wood waste is first reduced through interaction between the hammers on the hammermill 18 and the anvil 32. The wood fragments are driven past the anvil 32 into the space between the hammermill 18 and the grates 36. The continued hammering action of the hammermill 18 further reduces the wood waste until it is driven through the openings in the grates 36. The reduced wood falls onto an intermediate conveyor 38 (typically a belly conveyor) extending below the hammermill 18 (See FIG. 8). The intermediate conveyor 38 transports the output to an inclined conveyor 40 (See FIG. 4) that lifts the output to facilitate piling. Given that the ground wood is forced into the space between the hammermill 18 and the anvil and through the grates 36, the size of the ground output is dictated in part by the anvil spacing and the size of the openings in the grates 36. The engine assembly 20, directly or indirectly, provides power to the various driven components of the wood reduction apparatus 10. For example, the engine assembly 20 drives the hammermill 18 through an arrangement of belts (not shown). As another example, the engine assembly 20 may drive one or more a hydraulic pumps (not shown) that can be used to operate hydraulic components.

III. Rotor Assembly

Figure 1B:
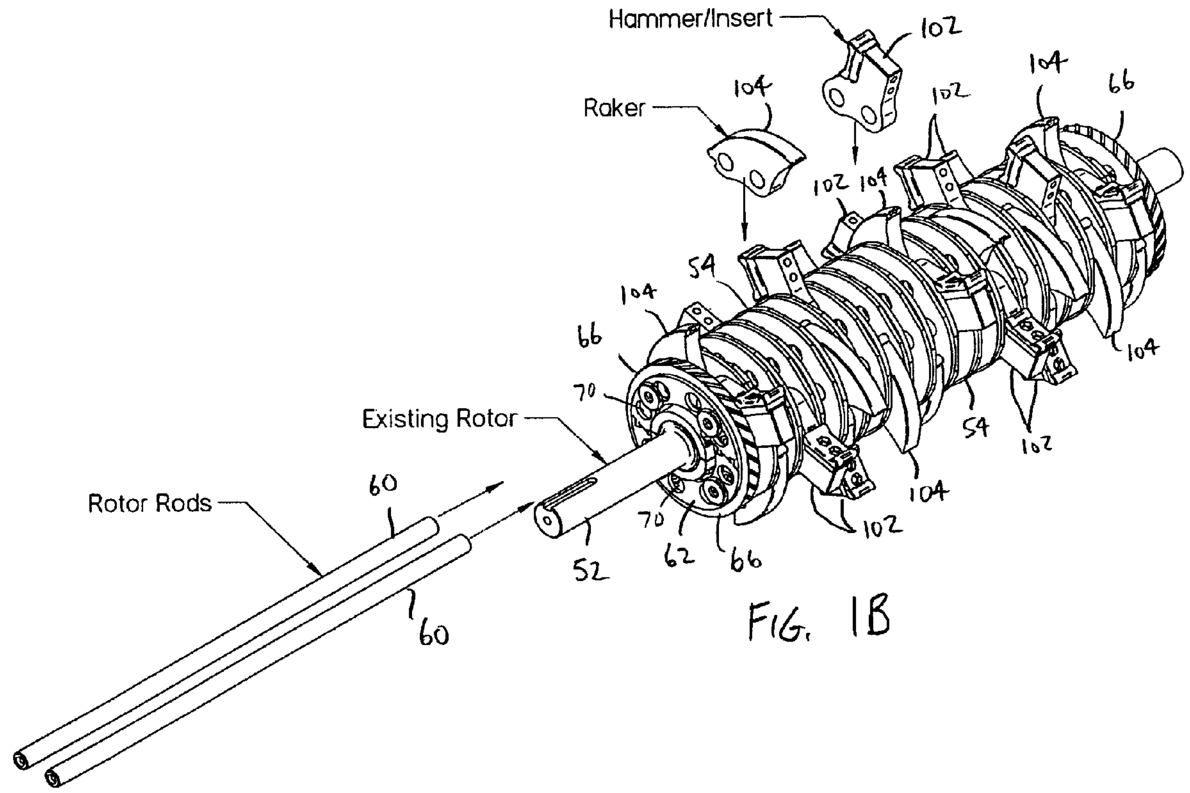
FIG. 1B is a partially exploded perspective view of the hammermill.

As noted above, the present invention is directed to chipper inserts 200 that may be installed on a hammermill rotor to convert the hammermill into a drum chipper. The hammermill 18 of one embodiment is shown in FIGS. 1A and 1B. As shown, the hammermill 18 generally includes a rotor 50 and a plurality of hammer inserts 100. Referring now to FIGS. 3A and 3B, the rotor 50 of this embodiment generally includes a shaft 52 carrying a plurality of alternately stacked rotor plates 54 and spacers 56. The shaft 52 is a generally cylindrical member having a pair of opposed keyway 53. The ends of the shaft 52 may be shaped to facilitate mounting on the base assembly 30. The rotor plates 54 are generally disc-shaped and define a central hole to allow the rotor plates 54 to be fitted onto the shaft 52. The spacers 56 are also generally disc-shaped and define a central hole for installation on the shaft 52. Depending on thickness, one or more spacers 56 may be disposed between each pair of adjacent rotor plates 54. For example, in the illustrated embodiment, three spacers 56 may be disposed between each pair of adjacent rotor plates 54. The rotor plates 54 have a substantially greater diameter that the spacers 56. The rotor plates 54 and spacers 56 of the illustrated embodiment each include a pair of opposed keyways 55 that allows them to be fixed on the shaft 52 by a pair of keys 57. The rotor plates 54 also define a plurality of rotor pin openings 58 to receive rotor pins 60. The rotor pin openings 58 of adjacent plates are aligned so that rotor pins 60 may be inserted through the stack of plates 54 and spacers 56. The rotor pins 60 are generally rod shaped and generally coincide in length with the stack. In the illustrated embodiment, eight rotor pins openings 58 are spaced in radial symmetrically about the plates to receive eight rotor pins 60. The number of rotor pins 60 (and hence rotor pin openings 58) may vary from application to application, as desired. Opposite ends of the stack are closed by end plates 66. The end plates 66 are secured to the shaft 52 to contain and secure the stack. The end plates 66 may be secured by wedge lock clamps 74 that close on annulus formed in the shaft 52. The end plates 66 define rotor pin openings 68 and are fitted with rotatable locking rings 62 to secure the rotor pins 60 within the stack. The locking rings 62 include a plurality of openings 70 that are spaced apart in the same pattern as the rotor pin openings 58 in the rotor plates 54 and the end plates 66. The locking rings 62 define a series of mounting slots 64 (See FIG. 3) and are secured to the end plates 66 by bolts 65 extending through the slots 64 (See FIGS. 1A and 1B). In use, the locking rings 62 can be rotated into alignment with the rotor pin openings 58, 68 to permit installation or removal of the rotor pins 60, or rotated out of alignment to close the rotor pin openings 58, 68 and lock the rotor pins 60 in the stack.

Figure 9:
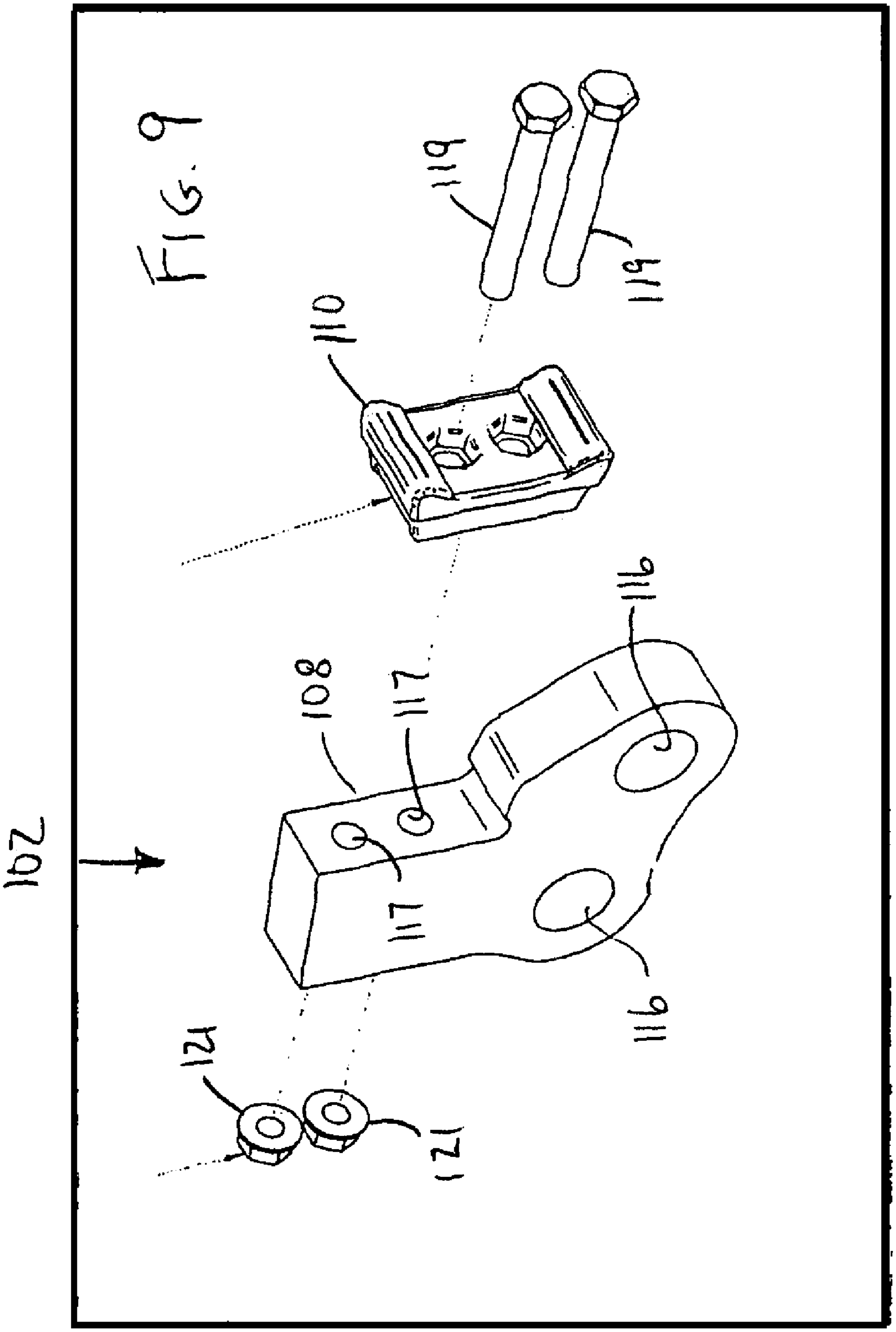
FIG. 9 is an exploded perspective view of a hammer insert.
Figure 11:
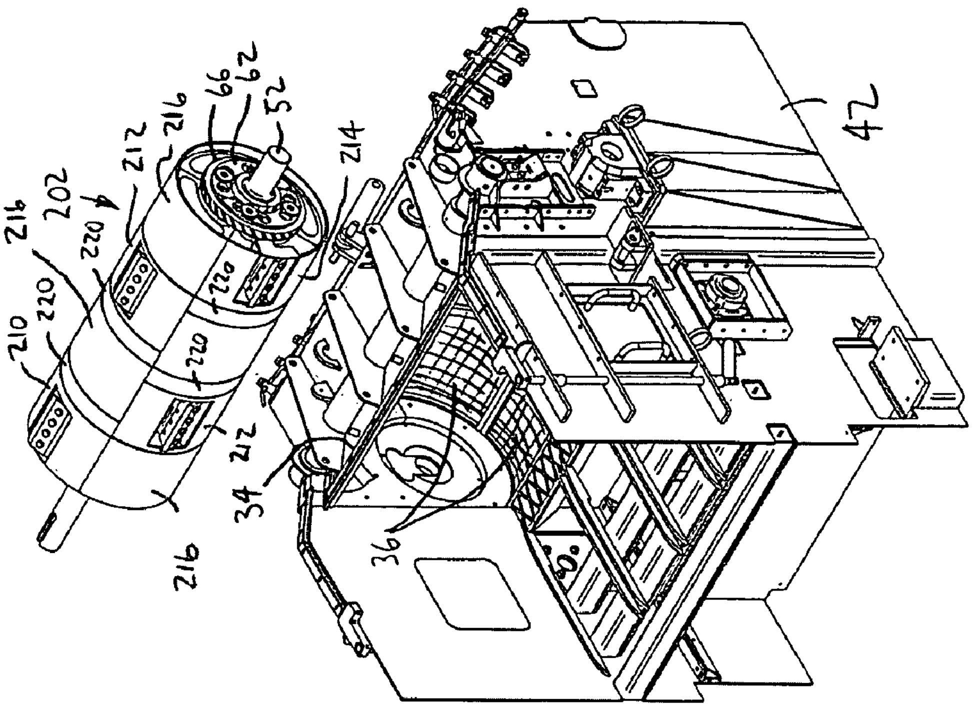
FIG. 11 is a partially exploded perspective view of the chipper drum base assembly.
Figure 10:
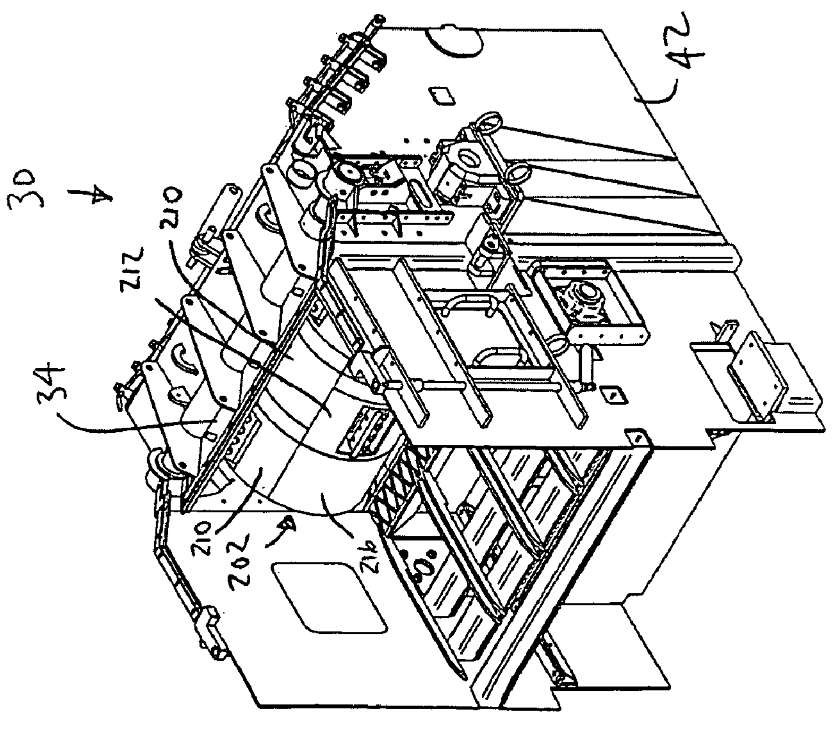
FIG. 10 is a perspective view of the chipper drum base assembly.
Figure 20:
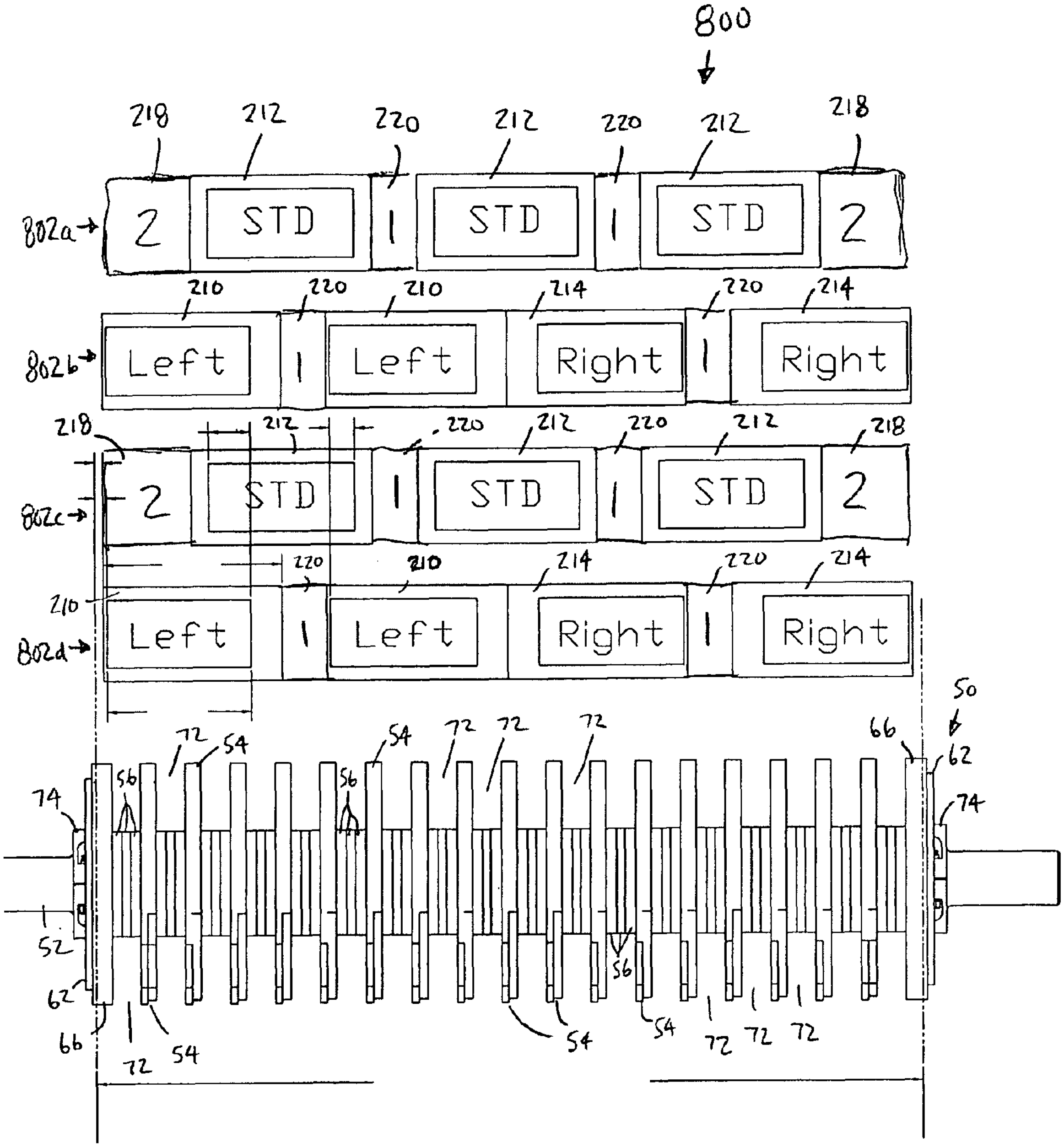
FIG. 20 is a representational view of a chipper insert pattern.

As perhaps best shown in FIGS. 3A and 20, the alternating arrangement of rotor plates 54 and spacers 56 creates a plurality of annular channels 72 spaced along the rotor 50 to receive either hammer inserts 100 or chipper inserts 200. The rotor pins 60 extend axially through the channels 72 to provide a mounting structure for the hammer inserts 100 and the chipper inserts 200. In this embodiment, the hammer inserts 100 include three different types of inserts—hammers 102, rakers 104 and blanks 106. A hammer 102 is shown in FIG. 9. As can be seen, the hammer 102 generally includes an insert holder 108 and a hammer insert 110. The hammer insert 110 is secured to the insert holder 108 by bolts 119 extending through holes 117 and secured by nuts 121. The base of the insert holder 108 defines a pair of mounting bores 116 that are interfitted with an adjacent pair of rotor pins 60. The rakers 104 and blanks 106 may also be configured with a pair of mounting bores for mounting on adjacent rotor pins 60. The hammer insert may be secured to the insert holder 108 by a pair of bolts 112 and locknuts 114. The hammers 102, rakers 104 and blanks 106 are mounted about the rotor 50 in the desired pattern. The pattern may vary from application to application. However, in the illustrated embodiment, one hammer 102, one raker 104 and two blanks 106 are mounted in that order around each annular channel 72. The radial position of these components may vary from channel to channel to, among other things, provide a balanced hammermill. When hammer inserts 100 are installed of the rotor 50, the assembly functions as a conventional hammermill 18 to grind wood waste and provide a ground wood output.

Figure 2B:
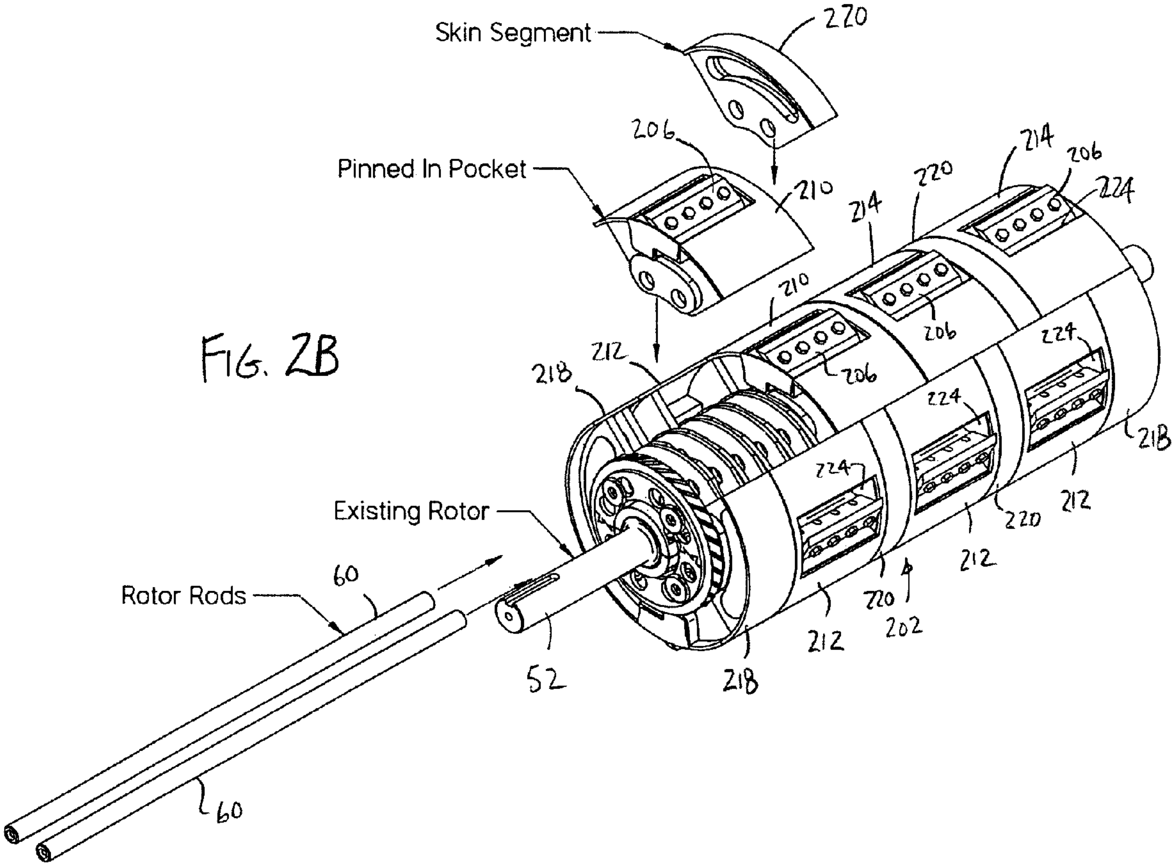
FIG. 2B is a partially exploded perspective view of the chipper drum.

As noted above, the chipper inserts 200 are configured for installation on the rotor 50 in place of the hammer inserts 100 (See FIGS. 2A and 2B). More specifically, the chipper inserts 200 are configured to fit into the annular channels 72 and install on the rotor pins 60 in essentially the same manner as the hammer inserts 100. Once installed, the chipper inserts 200 collectively form a chipper drum 202 about the rotor 50. FIGS. 10-13 show the chipper drum 202 installed within the base assembly 30. As can be seen, the chipper drum 202 is fitted into the base assembly 30 is essentially the same way as the hammermill 18. In the illustrated embodiment, the chipper inserts 200 are installed on the rotor 50 without removing the rotor 50 from the base assembly. In the illustrated embodiment, the chipper drum 202 includes a generally continuous drum surface 202 and a plurality of cutter pockets 224. A cutter 206 is mounted in each pocket 224 to provide a knife for reducing wood waste primarily by cutting it into chips. The cutter pockets 224 and cutters 206 may be arranged around the rotor 50 in different patterns to provide the desired performance. When chipper inserts 200 are installed, the assembly is effectively converted into a drum chipper capable of producing high quality, consistent output. In the illustrated embodiment, there is a space of approximately ⅞ of an inch between the outer surface of the chipper drum 202 and the inner surfaces of the anvil 32 and the grates 36. In the illustrated embodiment, the cutters 206 extend approximately ⅝ of an inch beyond the outer surface of the chipper drum 202. This results in a space of approximately ¼ of an inch between the cutters 206 and the inner surfaces of the anvil 32 and the grates 36. The spacing of these components may vary from application to application, as desired.

In the illustrated embodiment, the chipper inserts 200 include three different cutting inserts, namely, a left cutter insert 210, a center cutter insert 212, a right cutter insert 214; and three different spacer inserts, namely, a large spacer insert 216, a medium spacer insert 218 and a small spacer insert 220. Generally speaking, the left cutter insert 210 includes a cutter 206 that is offset to the left to reduce the dead space at the left end of the drum 202, the right cutter insert 214 includes a cutter 206 that is offset to the right to reduce the dead space at the right end of the drum 202 and the center cutter insert 210 includes a centrally disposed cutter 206. The cutter inserts 210, 212 and 214 are disposed around the rotor 50 to define a chipper drum having the desired cutter pattern. The spacer inserts 216, 218 and 220 are sized to fill the spaces between the cutter inserts 210, 212 and 214. The spacer inserts 216, 218 and 220 are disposed around the rotor 50 in the spaces between and around the cutter inserts 210, 212 and 214 to provide the chipper drum 202 with a generally continuous surface. In the illustrated embodiment, the cutter inserts and spacer inserts are configured in quadrant sections, such that it takes four inserts to extend around the rotor. The radial size of the inserts 200, however, may vary from application to application resulting in the use of more or less inserts to extend around the rotor. In this embodiment (in which the rotor 50 includes eight evenly spaced rotor pins 60 and the inserts 200 are in quadrant sections), each insert 200 is configured to mount to two adjacent rotor pins 60. Accordingly, each insert 200 defines a pair of mounting holes 230 configured to be interfitted with corresponding rotor pins 60. The number of different types of cutter inserts and spacer inserts may vary from application to application. For example, in some embodiments, it may be desirable to utilize only center cutter inserts. As another example, in some embodiments, it may be desirable to utilize only left and right cutter inserts.

Figures 14A, 14B, 14C, 14D:
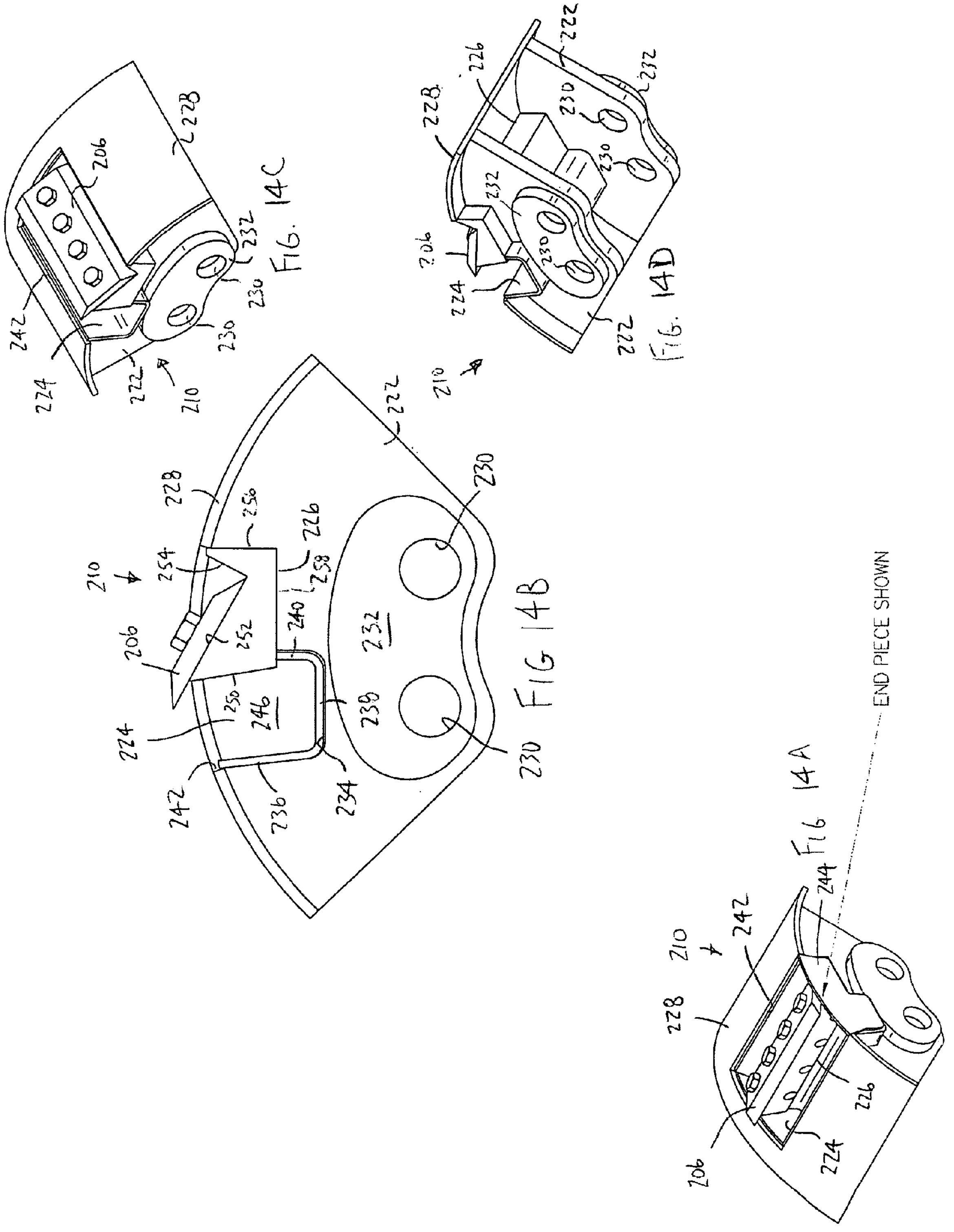
FIG. 14A is a top, front perspective view of the left cutter insert.
FIG. 14B is a side elevational view of the left cutter insert with an end panel removed.
FIG. 14C is a top, back perspective view of the left cutter insert.
FIG. 14D is a bottom, front perspective view of the left cutter insert.

The left cutter insert 210 is described with reference to FIGS. 14A-14D. FIGS. 14B-D show the left cutter insert 210 with an end panel 244 removed to show the internal construction of the cutter pocket 224. FIG. 14A shows the left cutter insert 210 with the end panel 244 in place. The left cutter insert 210 generally includes a pair of mounting legs 222, a cutter pocket 224, a cutter block 226 and a skin 228. A cutter 206 is mounted on cutter block 226 within the cutter pocket 224. The mounting legs 222 are located toward opposite axial ends of the left cutter insert 210 (See FIG. 14D). The mounting legs 222 are spaced-apart a distance equal to a multiple of the spacing interval between the annular channels 72 of the rotor 50. This permits the mounting legs 222 to be fitted into the annular channels 72 where they can be secured by the rotor pins 60. For example, in the illustrated embodiment, the left cutter insert 210 is configured to fill the space associated with four annular channels 72. Accordingly, in this embodiment, the mounting legs 222 of the left cutter insert 210 are spaced apart an appropriate distance to fit into annular channels 72 that are separated from one another by two annular channels 72. This spacing may vary from application to application. Each mounting leg 222 defines a pair of mounting holes 230 sized to closely interfit with the rotor pins 60. The mounting legs 222 may include reinforcing plates 232 that are disposed over the mounting holes 230. The reinforcing plates 232 define mounting holes 230 that corresponding with mounting holes 230. The reinforcing plates 232 may be sized so that the combined thickness of the reinforcing plates 232 and the mounting legs 222 closely matched the width of the annular channels 72. The outer ends of the mounting legs 222 support the skin 228 and are curved to follow the desired shape of the chipper drum 202.

The skin 228 is a generally rectangular panel curved to follow a portion of the cylindrical chipper drum 202 (See FIGS. 14A and 14B). The skin 228 need not be curved and may have other shapes in alternative embodiments. In the illustrated embodiment, the skin 228 extends through ninety degrees of the circumference of the chipper drum 202. The skins 228 may, however, extend through different sections of the circumference. For example, each skin may extend through sixty degrees, thereby using six inserts to encircle the rotor. If desired, different skins may extend through different sections. For example, some skins may extend through ninety degrees while others extend through forty-five degrees. In the illustrated embodiment, the skin 228 is welded to the mounting legs 222. The skin 228 defines a cutter pocket opening 242. In this embodiment, the cutter pocket opening 242 is generally rectangular and extends from the left axial end of the insert 210 to allow the cutter 206 to extend close the left axial end of the insert 210. The skins 228 on the various cutter inserts and spacer inserts are sized and shaped to cooperatively fill all of the spaces between and around the cutter pockets 224. Further, the skins 228 are curved to cooperatively form a chipper drum 202 that is a substantially complete cylinder (excluding essentially only those regions occupied by the cutter pockets 224).

Referring now to FIG. 14B, the cutter pocket 224 is disposed radially inward from the skin 228 to define a cutting void 246 and to receive the cutter block 226 and cutter 206. The mounting legs define a cutout 234 configured to receive the cutter pocket 224 and the cutter block 226. The illustrated cutter pocket 224 is somewhat "U" shaped having a leading wall 236, a floor 238, a trailing wall 240 and end panels 244. The leading wall 236 extends inwardly from the skin 228 to the floor 238. In the illustrated embodiment, the floor 238 is generally perpendicular to the leading wall 236 closing the inner end of the cutter pocket 224. The angle between the leading wall 236 and the floor 238 may vary in alternative embodiments. For example, in one alternative embodiment, the leading wall 236 may be inclined (with respect to its orientation in the illustrated embodiment) to open up the mouth of the pocket 224. In this alternative embodiment, there may be an angle of approximately one-hundred and twenty degrees between the inclined leading wall 236 and the floor 238. The trailing wall 240 extends outwardly from the floor 238 closing the space between the floor 238 and the cutter block 226. End panels 244 close opposite axial ends of the cutter pockets 224. The end panels 244 are generally "L"-shaped covering the ends of the cutting void 246 and the cutter block 226. The size, shape and configuration of the cutter pocket 224 may vary from application to application.

As perhaps best shown in FIGS. 14B-14B, the cutter block is 226 has a somewhat complex shape. The cutter block 226 generally includes a leading surface 250, a cutter surface 252, a recess surface 254, a trailing surface 256 and a bottom surface 258. The leading surface 250 functions as a counter blade to assist the cutter 206 in chipping the wood waste. The leading surface 250 extends at an angle of approximately four degrees from a radius intersecting the inward-most edge of the leading surface 250. The cutter surface 252 receives the cutter 206. In the illustrated embodiment, the cutter block 226 defines a plurality of threaded bolt holes 260 that open into the cutter surface 252. In this embodiment, the cutter 206 is secured over the cutter surface 252 by bolts 262. The cutter surface 252 of the illustrated embodiment extends at an angle of approximately seventy-two degrees from a radius intersecting the inward-most edge of the cutter surface 252. The recess surface 254 of the illustrated embodiment extends at an angle of approximately ninety degrees to the cutter surface 252. The trailing surface 256 extends along the trailing end of the cutter block 226 from the top to the bottom surface 258. In the illustrated embodiment, the bottom surface 258 extends approximately perpendicularly to the trailing surface 256 and to a radius bisecting the left cutter insert 210. The cutter block 226 may be machined or otherwise formed from a block of steel or other suitable materials. The illustrated cutter block 226 is configured to hold the cutter 206 at a specific angle and at a specific height, and to provide a counter blade of a specific configuration. The size, shape and configuration of the cutter block 226 may vary from application to application, as desired.

Figure 15A:
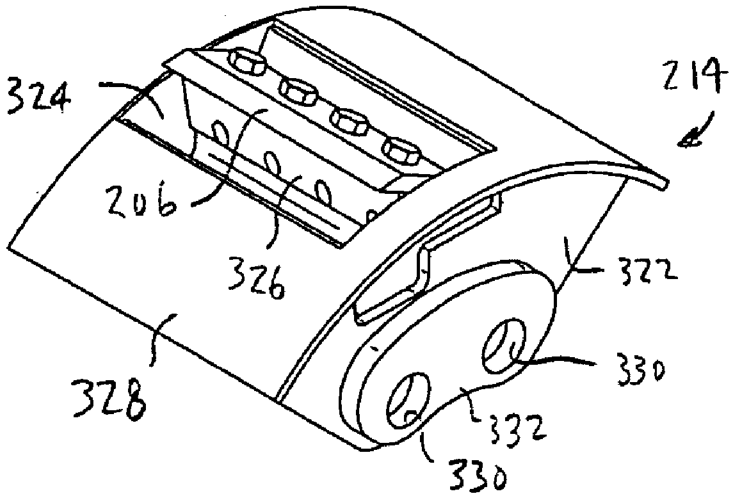
FIG. 15A is a top, front perspective view of the right cutter insert.
Figure 15B:
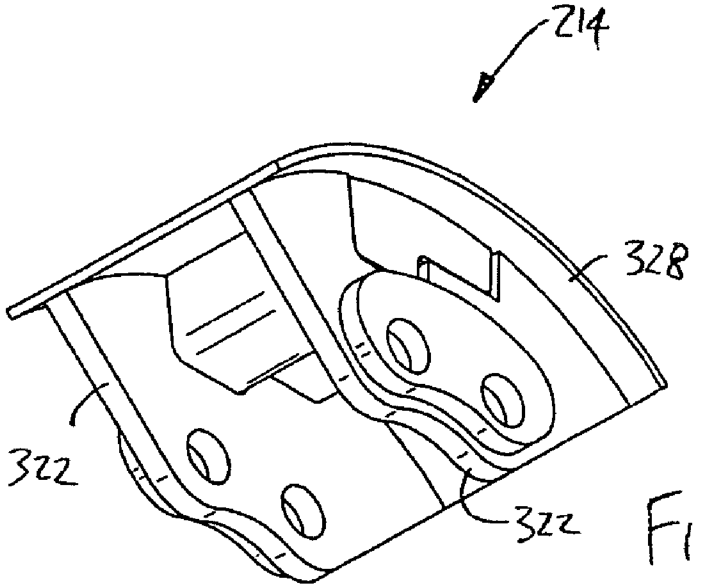
FIG. 15B is a bottom, front perspective view of the right cutter insert.

The right cutter insert 214 is essentially a mirror image of the left cutter insert 210 and therefore will not be described in detail. Although it will not be described in detail, the right cutter insert 214 generally includes a pair of mounting legs 322, a cutter pocket 324, a cutter block 326 and a skin 328. As with the left cutter insert 210, a cutter 206 is mounted on cutter block 326 within the cutter pocket 224 (See FIGS. 15A-15B). The right cutter insert 214 is configured to position the cutter 206 close to the right axial end of the insert 214. This permits right cutter inserts 214 to be positioned on the right end of the chipper drum 202 to reduce dead space.

Figure 16A:
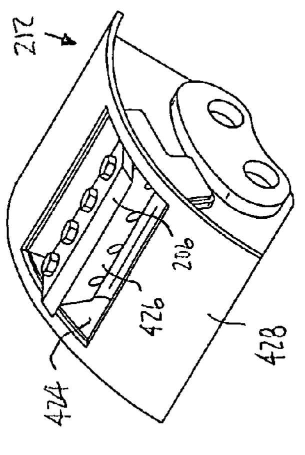
FIG. 16A is a top, front perspective view of the center cutter insert.
Figure 16B:
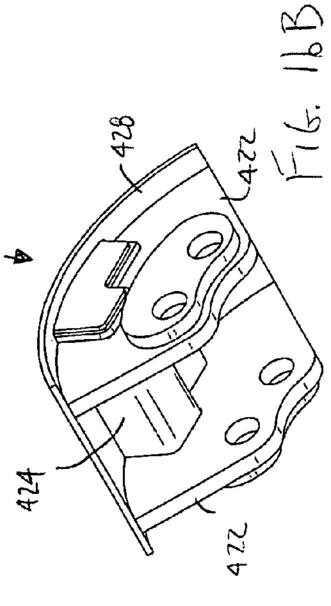
FIG. 16B is a bottom, front perspective view of the center cutter insert.

The center cutter insert 212 is generally identical to the left cutter insert 210 and the right cutter insert 214, except that it is configured to provide a centered cutter 206 (See FIGS. 16A-16B). Given its similarity to the left and right cutter inserts, the center cutter insert 212 will not be described in detail. In this embodiment, the center cutter insert 212 generally includes a pair of mounting legs 422, a cutter pocket 424, a cutter block 426 and a skin 428. As with the other cutter inserts 210 and 214, a cutter 206 is mounted on cutter block 426 within the cutter pocket 424. The cutter pocket 424 and cutter pocket opening 442 are substantially centered on the insert 212, which in turn centers the cutter block 426 and cutter 206.

In the illustrated embodiment, the cutters 206 are double-edged blades that are removable secured in the cutter pockets 224, 324 and 424. The cutters 206 may be reversed when one edge becomes dull. As noted above, the chipper inserts 200 may include a cutter block 226, 326 and 426 that is supported within the cutter pocket 224, 324 and 424. The cutters 206 may be secured to the cutter blocks by bolts or other fasteners that facilitate quick and easy reversing or replacement of the cutters 206. The cutters 206 protrude from the pockets 224, 324 and 424 a desired distance, such as ⅝ of an inch, that can easily be adjusted from application to application, if desired.

The spacer inserts 216, 218 and 220 are similar in construction to the cutter inserts 210, 212 and 214, except that they do not include any cutter components (i.e. cutters 202, cutter pockets 224 or cutter blocks 226). Referring now to FIGS. 17A-B, 18A-B and 19, the large spacer 216 is configured to fill the space associated with four annular channels 72, the medium spacer insert 218 is configured to fill the space associated with two annular channels 72 and the small spacer insert is configured to fill the space associated with a single annular channel 72. The size and number of different sized spacer inserts may vary from application to application.

Figure 17A:
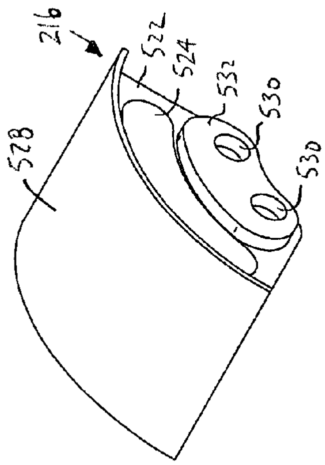
FIG. 17A is a top, front perspective view of the large spacer insert.
Figure 17B:
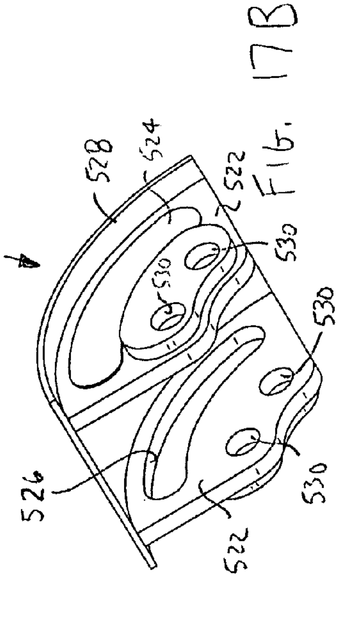
FIG. 17B is a bottom, front perspective view of the large spacer insert.

As perhaps best shown in FIGS. 17A-17B, the large spacer insert 216 generally includes a pair of mounting legs 522 and a skin 528. The skin 528 is a generally rectangular plate that is curved to follow the desired profile of the chipper drum 202. The mounting legs 522 extend inwardly from the skin 528 to provide a mounting structure for securing the large spacer insert 216 using the rotor pins 60. The mounting legs 522 are spaced apart an appropriate distance to fit within two annular channels 72 that are separated from one another by two annular channels 72. The mounting legs 522 each define a pair of mounting holes 530 sized to closely interfit with the rotor pins 60. The mounting legs 522 may include reinforcing plates 532 that are disposed over the mounting holes 530. The reinforcing plates 532 define mounting holes 530 that corresponding with mounting holes 530. The reinforcing plates 532 may be sized so that the combined thickness of the reinforcing plates 532 and the mounting legs 522 closely matched the width of the annular channels 72. Each mounting plate 522 may define a somewhat kidney-shaped opening 526 to reduce the overall weight of the insert 216. With the large spacer insert 216, the kidney-shaped openings 526 may be covered by a relatively thin cover 524 that prevents debris from entering into the space inwardly of skin 528.

The medium spacer insert 218 (See FIG. 19) is essentially identical to the large spacer insert 218, except that it is not as wide. The medium spacer insert 218 is designed to cover two annular channels 72 and therefore is essentially one-half the width of the large spacer insert 218. More specifically, the medium spacer insert 218 includes a skin 628 that is one-half the width of skin 528, and includes mounting legs 622 that are spaced apart an appropriate distance to fit within adjacent annular channels 72. The mounting legs 622 may define kidney-shaped weight reduction openings (not shown). In this embodiment, the openings (not shown) are covered by thin plates 624 to prevent debris from passing though the openings.

Figure 18C:
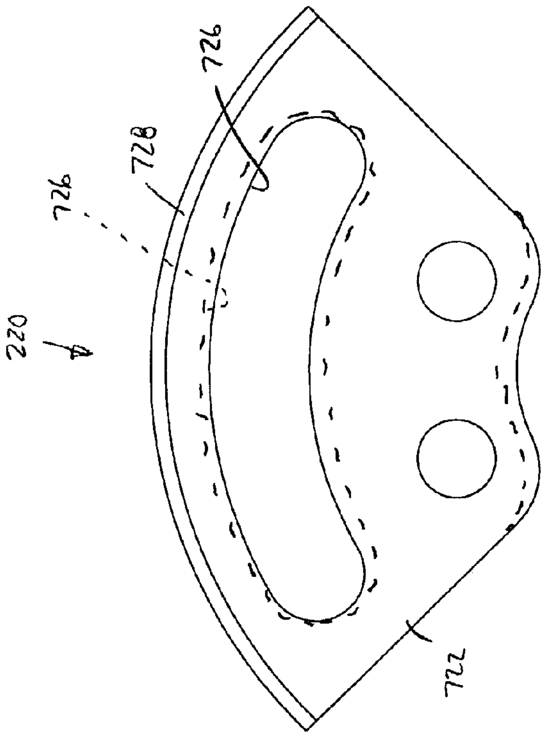
FIG. 18C is a side elevational view of the small spacer insert.
Figure 18A:
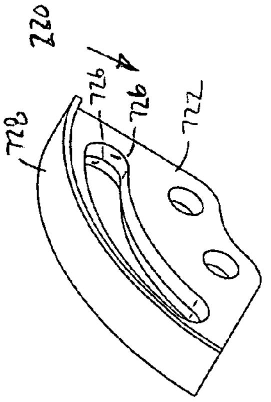
FIG. 18A is a top, front perspective view of the small spacer insert.
Figure 18B:
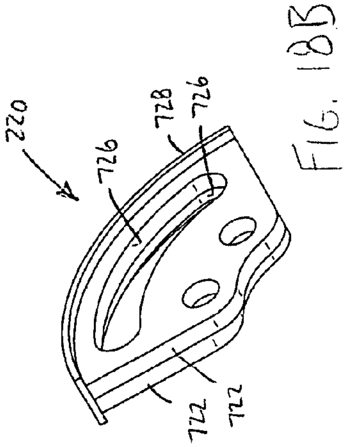
FIG. 18B is a bottom, front perspective view of the small spacer insert.

Referring now to FIGS. 18A and 18B, the small spacer insert 220 is similar to the large and medium spacer inserts. The small spacer insert 220 generally includes a skin 728 and a pair of mounting legs 722. The small spacer insert 220 is designed to cover a single annular channel 72. As a result, the small spacer insert 220 includes a skin 728 that is one-half the width of medium spacer insert skin 628, and includes mounting legs 722 that match the width of a single annular channel 72. In this embodiment, the two mounting legs 722 are laminated together to form what is essentially a single legs of appropriate size to fit into an annular channel 72. The small spacer inserts 220 may include mounting legs 722 that define kidney-shaped weight reduction openings 726. In this embodiment, the openings 726 are not covered because the small spacer inserts 220 are not intended to be positioned on an axial end of the chipper drum 202 where they might be subjected to a high amount of debris. Covers may be added in applications where the small spacer inserts 220 may be positioned on an end of the chipper drum 202. One of the two mounting legs 522 may be slightly longer than the other and it may define a weight reduction opening 726 that is slightly larger than the other to allow the two legs to be more easily joined together by welding (See broken lines in FIG. C). If desired, the two laminated mounting legs 522 may be replaced by a single mounting leg of appropriate thickness.

The cutter inserts and spacer inserts each have an axial length substantially shorter than that of the chipper drum 202. For example, each chipper insert may be shorter than approximately one fourth of the axial length of the chipper drum. In the illustrated embodiment, the rotor 50 defines eighteen annular channels 72, but this may vary from application to application. In this embodiment, the cutter inserts have a width equal to approximately four annular channel 72, and the spacer inserts come in varying widths of one annular channel 72 (small spacer insert), two annular channels 72 (medium spacer insert) and four annular channels 72 (large spacer insert). With this embodiment, various combinations of cutter inserts and spacer inserts of different widths can be combined to extend the full axial length of the chipper drum.

Figure 19:
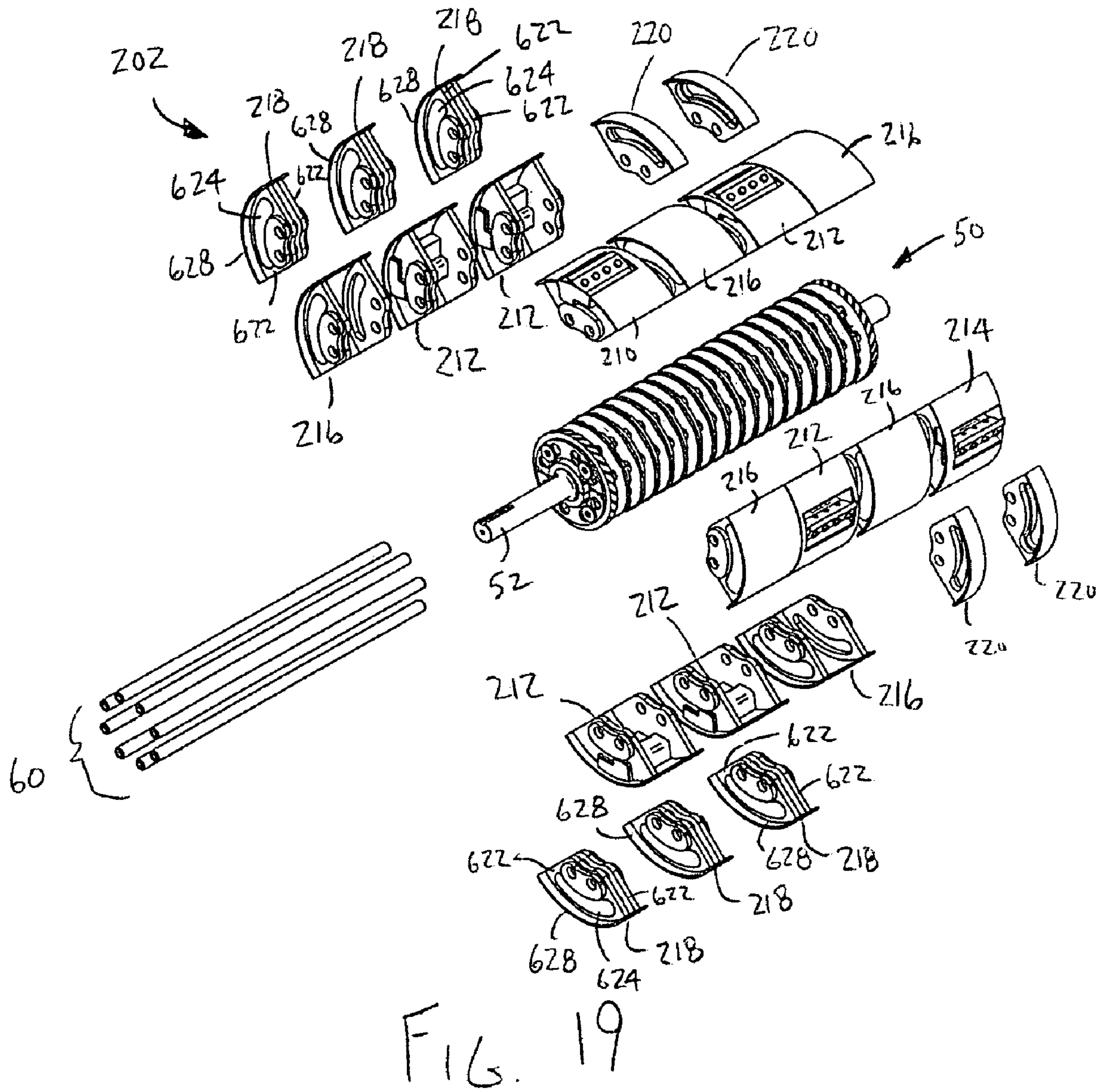
FIG. 19 is an exploded perspective view the rotor and the chipper drum.

Installation of the chipper inserts 200 will now be described with reference to FIG. 19. FIG. 19 is an exploded perspective view of the chipper drum 202 and the rotor 50 showing specific pattern of chipper inserts 200. This pattern is described in more detail below with reference to FIG. 21. As noted above, the present invention allows the hammermill 18 to be converted into a chipper drum 202 by removing the hammer inserts 100 and replacing them with a set of chipper inserts 200. The chipper inserts 200 may be installed on the rotor 50 by opening the locking ring 62 on at least one end of the hammermill 18. The rotor pins 60 are then removed by pulling them out of the rotor 50 in an axial direction through the locking ring openings 70. As the rotor pins 60 are removed, they disengage the hammer inserts 100, thereby allowing them to be removed from the rotor 50. Once all the rotor pins 60 and hammer inserts 100 have been removed, the chipper inserts 200 may be installed on the rotor 50. The chipper inserts 200 may be installed in sequence as the rotor pins 60 are reinserted into the rotor 50. Although FIG. 19 shows a specific chipper insert pattern, the chipper inserts 200 may be installed on the rotor in a wide variety of patterns. Once all of the chipper inserts 200 and rotor pins 60 are installed, the locking ring 62 may be closed to secure the rotor pins 60 within the rotor 50. FIG. 20 is a representational view of a first pattern 800 in which four rows of chipper inserts 200 are installed about the rotor 50. In this embodiment, the first and third rows 802*a* and 802*c*, respectively, are identical—each including (from left to right) a medium spacer insert 218, a center cutter insert 212, a small spacer insert 220, a second center cutter insert 212, a second small spacer insert 220, a third center cutter insert 212 and a second medium spacer insert 218. The second and fourth rows 802*b* and 802*d*, respectively, are also identical. These two rows 802*b*, 802*d* includes a left cutter insert 210, a small spacer insert 220, a second left cutter insert 210, a right cutter insert 214, a second small spacer insert 220 and a second right cutter insert 214.

Figure 21:
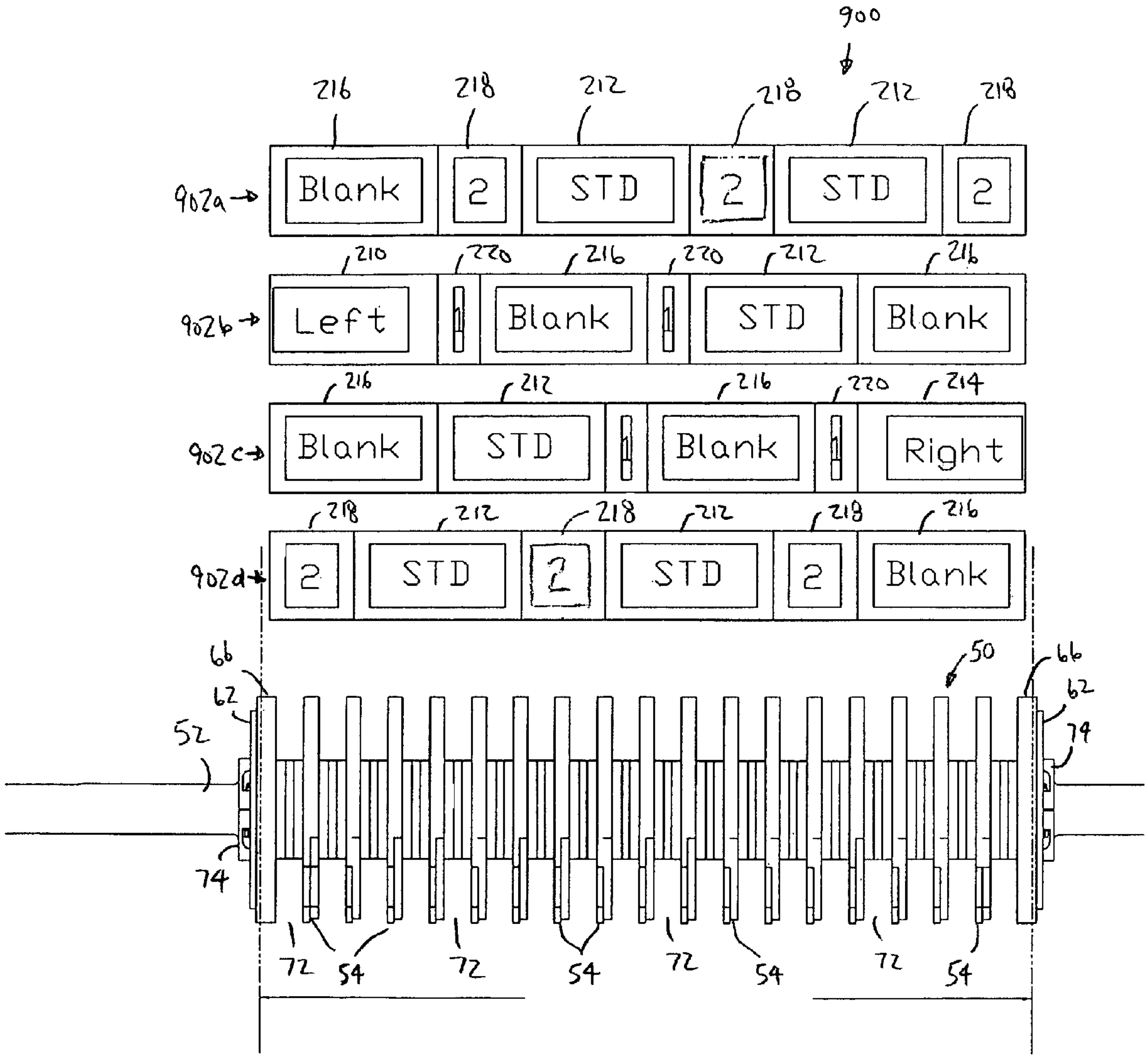
FIG. 21 is a representational view of an alternative chipper insert pattern.

FIG. 21 is a representational view of an alternative chipper insert pattern 900 in which four rows of chipper inserts 200 are installed about the rotor 50. In this embodiment, the first row 902*a* includes (from left to right) a large spacer insert 216, a first medium spacer insert 218, a center cutter insert 212, a second medium spacer insert 218, a second center cutter insert 212 and a second medium spacer insert 218. The second row 902*b* includes a left cutter insert 210, a small spacer insert 220, a large spacer insert 216, a second small spacer insert 220, a center cutter insert 212 and a second large spacer insert 216. The third row 902*c* includes a large spacer insert 216, a center cutter insert 212, a small spacer insert 220, a second large spacer insert 216, a second small spacer insert 220 and a right cutter insert 214. The fourth row 902*d* includes a medium spacer insert 218, a center cutter insert 212, a second medium spacer insert 218, a second center cutter insert 212, a third medium spacer insert 218 and a large spacer insert 216.

A variety of characteristics may be adjusted to control output size and quality. For example, it may be desirable to vary the clearance of the cutter 206 above the chipper drum 202, spacing between the chipper drum 202 and the anvil 32, spacing between the chipper drum 202 and the grates 36, speed at which wood waste is fed into the chipper drum 202 and chipper drum rotation speed. It may also (or alternatively) be desirable to remove the grinding grates 36 or replace them with grates 36 of different sized openings.

Figure 22:
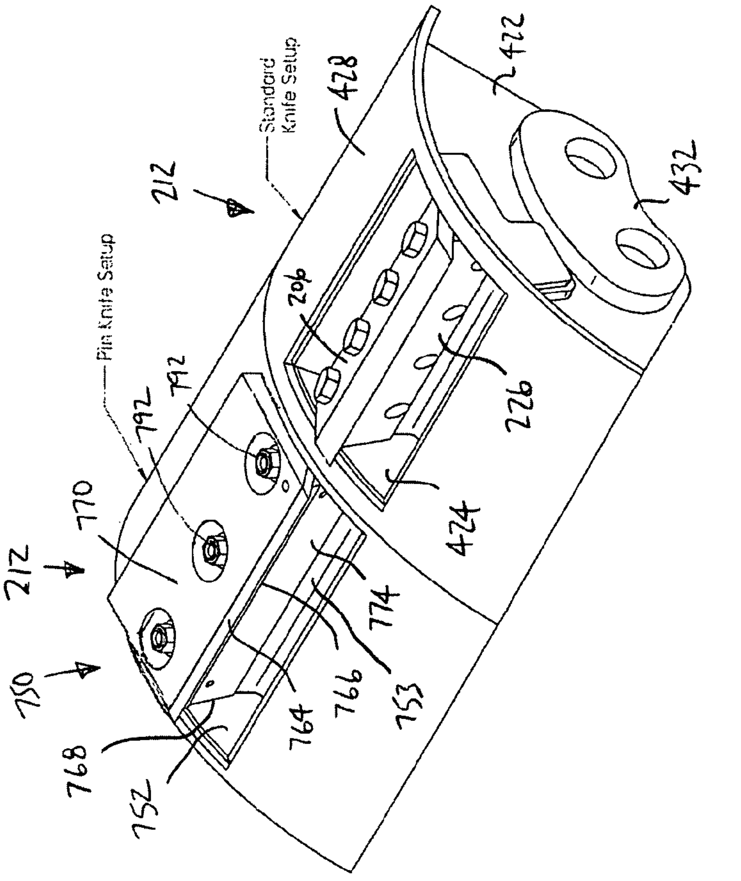
FIG. 22 is a perspective view of a cutter insert with a pin knife assembly adjacent to a cutter insert with a cutter/cutter block assembly.
Figure 23:
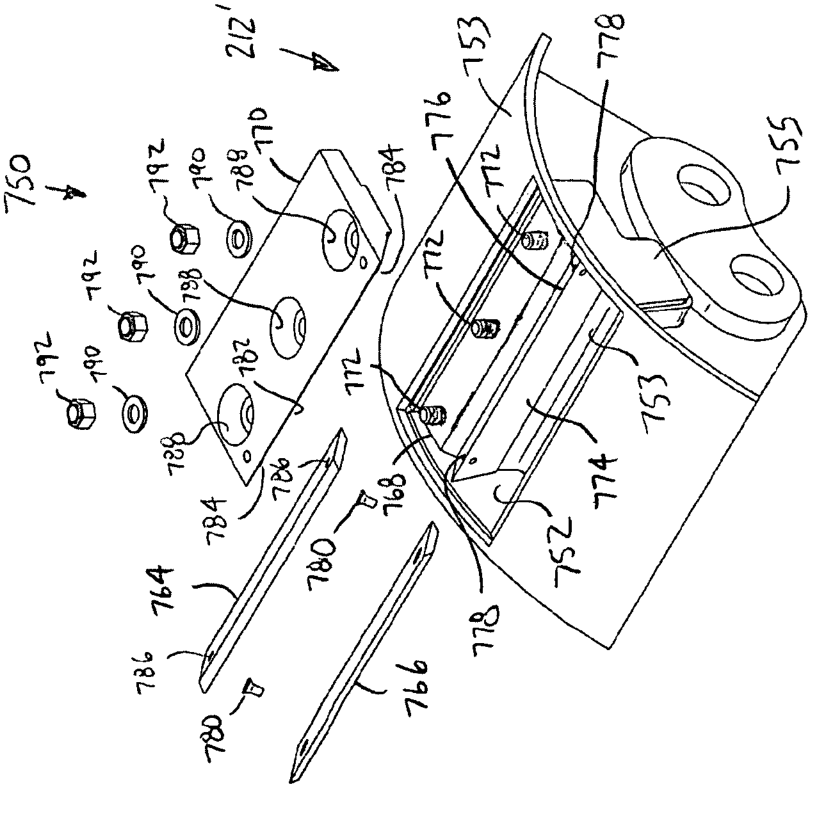
FIG. 23 is an exploded perspective view of a cutter insert with a pin knife assembly.

In an alternative embodiment, the cutter inserts may include a pin knife assembly 750 rather than the cutter/cutter block assembly described above. For purposes of disclosure, the pin knife assembly 750 is described in connection with a center cutter insert. FIG. 22 shows center cutter inserts 212, 212' positioned side-by-side. Center cutter insert 212 includes the cutter/cutter block assembly described above and center cutter insert 212' includes the alternative pin knife cutter assembly. The pin knife assembly 750 may be incorporated into left and right cutter inserts as well. In this alternative embodiment, the cutter inserts are essentially identical to the left, center and right cutter inserts described above, except that the cutter components are varied as described below. The cutter pocket 752 is generally identical to the cutter pocket 224 of left cutter insert 210. As perhaps best shown in FIG. 23, the pin knife assembly 750 generally includes a knife 764, a counter-knife 766, a mount block 768, clamp 770 and a plurality of threaded shafts 772. The mount block 768 is mounted to the cutter insert in essentially the same manner as cutter block 226. For example, the mount block 768 may be welded to the components that define the cutter pocket 752, such as trailing wall 753 and end wall 755. The mount block 768 includes an inclined front face 774 that extends at an angle of approximately eight degrees from a radius intersecting the inward-most edge of the front face 774. The mount block 768 also includes a counter-knife surface 776 to receive the counter-knife 766. The mount block 768 defines a plurality of threaded screw holes 778 that open into the counter-knife surface 776. In this embodiment, the counter-knife 766 is secured over the counter-knife surface 776 by cap screws 780. The heads of the cap screws 780 are countersunk into the counter-knife 766. The counter-knife surface 776 of the illustrated embodiment extends at an angle of approximately fifty-four degrees from a radius intersecting the inward-most edge of the counter-knife surface 776. The knife 764 is end-beveled on opposite sides providing two cutting edges that allow the knife 764 to be reversed to present a fresh cutting edge when the first edge becomes dull. The knife 764 defines a pair of pin holes 786 for securing the knife 764 to the clamp 770. The clamp 770 includes a knife receiving inclined front face 782. The front face 782 of the illustrated embodiment extends at an angle of approximately fifty-four degrees from a radius intersecting the inward-most edge of the front face 782. A pair of pins 784 extend from the front face 782 of the clamp 770 to engage the pin holes 786 in the knife 764. The clamp 770 also defines a plurality of countersunk through bores 788. A plurality of threaded shafts 772 extend outwardly from the shoulder 760. For example, the threaded shafts 772 may be bolts or threaded studs that are welded or otherwise secured to the shoulder 760. The clamp 770 is installed over the shafts 772 by fitting the shafts 772 through the countersunk through bores 788 and installing washers 790 and nuts 792. The illustrated mount block 768 and clamp 770 are configured to set a specific interrelationship between the knife 764, the counter-knife 766 and the other components of the pin knife assembly 750. These components may be varied to adjust the angle, height and other characteristics of the knife 764 and counter-knife 766. For example, the size, shape and configuration of the mount block 768 and/or the clamp 770 may vary from application to application, as desired. The pin knife assembly 750 is similar to the pin knife assembly shown in U.S. Pat. No. 6,953,167 to Strong, which issued Oct. 11, 2005, which is incorporated herein in its entirety by reference.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A chipper drum comprising:

a rotor; and a plurality of inserts removably mounted about said rotor, at least one of said inserts including a cutter pocket and a cutter mounted within said pocket, each of said inserts including a drum surface, said drum surfaces collectively defining a chipper drum about said rotor;

wherein said plurality of inserts includes a right cutter insert and a left cutter insert;

said right cutter insert having a right axial end, a cutter and a cutter pocket; said cutter of said right cutter insert being offset toward said right axial end of said right cutter insert; and said left cutter insert having a left axial end, a cutter and a cutter insert; said cutter of said left cutter insert being offset toward said left axial end of said left cutter insert.

2. The chipper drum of claim 1 wherein said chipper drum is generally continuous except for all cutter pockets of said plurality of chipper inserts.

3. The chipper drum of claim 2 wherein said rotor is a stacked plate rotor defining a plurality of annular channels, at least one of said plurality of inserts including a pair of mounting legs, each of said mounting legs being fitted into a separate one of said annular channels.

4. The chipper drum of claim 2 wherein said rotor includes a plurality of axially extending rotor pins; and wherein at least one of said inserts includes a mounting leg defining a pair of mounting holes, a pair of said rotor pins extending through said mounting holes to removably mount said at least one insert to the rotor.

5. The chipper drum of claim 4 wherein each of said inserts includes a drum surface defining a quadrant section of a cylinder, whereby four of said inserts are required to define the full circumference of the drum surface.

6. The chipper drum of claim 1 wherein said plurality of inserts includes at least one cutter insert having a cutter and a cutter pocket, and at least one spacer insert devoid of any cutter or cutter pocket.

7. The chipper drum of claim 1 wherein said rotor includes a left axial end and a right axial end, at least one left cutter insert being mounted at said left axial end of the rotor and at least one right cutter insert being mounted at said right axial end.

8. A chipper drum comprising:

a rotor; and a plurality of inserts removably mounted about said rotor, at least one of said inserts including a cutter pocket and a cutter mounted within said pocket, each of said inserts including a drum surface, said drum surfaces collectively defining a chipper drum about said rotor;

wherein said plurality of inserts includes a right cutter insert, a left cutter insert and a center cutter insert;

said right cutter insert having a right axial end, a cutter and a cutter pocket; said cutter of said right cutter insert being offset toward said right axial end of said right cutter insert;

said left cutter insert having a left axial end, a cutter and a cutter insert; said cutter of said left cutter insert being offset toward said left axial end of said left cutter insert; and said center cutter insert having a cutter and a cutter insert; said cutter of said center cutter insert being substantially axially centered on said center cutter insert.

9. The chipper drum of claim 8 wherein said plurality of cutter inserts includes at least one spacer insert devoid of any cutter or cutter pocket.

10. The chipper drum of claim 8 wherein said plurality of cutter inserts includes at least two spacer inserts of different width in an axial direction, said spacer inserts being devoid of any cutter or cutter pocket.

11. The chipper drum of claim 8 wherein said plurality of cutter inserts includes at least three spacer inserts of different widths in an axial direction, said spacer inserts being devoid of any cutter or cutter pocket.

12. A wood reduction apparatus having a rotor convertible between a hammermill and a chipper drum comprising:

a plurality of hammer inserts, said hammer inserts being mountable on said rotor to convert said rotor into a hammermill;

a plurality of chipper inserts, said chipper inserts being mountable on said rotor in place of said hammer inserts to convert said rotor into a chipper drum; and wherein each of said chipper inserts including a drum surface, said drum surfaces collectively defining a chipper drum about said rotor, at least one of said chipper inserts includes a cutter pocket and a cutter mounted within said pocket, said cutter protruding from within said pocket beyond said drum surface of said at least one chipper insert;

wherein said rotor is a stacked plate rotor defining a plurality of annular channels and having a plurality of removable axially extending rotor pins;

at least one of said chipper inserts including a pair of mounting legs, each of said mounting legs defining a pair of mounting holes and being fitted into a separate one of said annular channels; and a pair of said rotor pins extending through said mounting holes to removably mount said at least one chipper insert to the rotor.

13. The wood reduction apparatus of claim 12 wherein each drum surface defines a segment of a cylindrical drum, the drum surfaces shaped such that the chipper inserts may be combined on the rotor with additional chipper inserts to define a cylindrical chipper drum about the rotor.

14. The wood reduction apparatus of claim 12 wherein each drum surface defines a quadrant segment of a cylindrical drum.

15. The wood reduction apparatus of claim 12 further including a cutter block disposed within said cutter pocket, said cutter being removably mounted to said cutter block.

16. The wood reduction apparatus of claim 12 wherein said cutter has a width greater than the combined width of two annular channels.

17. The wood reduction apparatus of claim 12 wherein said cutter is reversible.

18. The wood reduction apparatus of claim 12 wherein said drum surfaces are further defined as curved skins, said skins corresponding in size and shape such that said skins are generally aligned and continuous with one another when installed on said rotor.

19. The wood reduction apparatus of claim 12 wherein said plurality of chipper inserts includes at least one cutter insert having a cutter and a cutter pocket, and at least one spacer insert devoid of any cutter or cutter pocket.

20. The wood reduction apparatus of claim 12 wherein said plurality of chipper inserts includes at least one left cutter insert having a cutter and a cutter pocket, at least one right cutter insert having a cutter and a cutter pocket and at least one spacer insert devoid of any cutter or cutter pocket.

* * * * *